United States Patent
Takakura et al.

(10) Patent No.: US 8,590,970 B2
(45) Date of Patent: Nov. 26, 2013

(54) SEAT DEVICE

(75) Inventors: Masayuki Takakura, Wako (JP); Daiga Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 13/518,896

(22) PCT Filed: Nov. 29, 2010

(86) PCT No.: PCT/JP2010/071245
§ 371 (c)(1),
(2), (4) Date: Jun. 25, 2012

(87) PCT Pub. No.: WO2011/077902
PCT Pub. Date: Jun. 30, 2011

(65) Prior Publication Data
US 2012/0292962 A1    Nov. 22, 2012

(30) Foreign Application Priority Data

Dec. 25, 2009  (JP) ................. 2009-294287
Dec. 25, 2009  (JP) ................. 2009-294397
Dec. 25, 2009  (JP) ................. 2009-294447
Dec. 25, 2009  (JP) ................. 2009-294765

(51) Int. Cl.
*B60N 2/30*   (2006.01)
*B60N 2/36*   (2006.01)

(52) U.S. Cl.
USPC ............................ 297/334; 297/331; 297/336

(58) Field of Classification Search
USPC ......................................... 297/331, 334, 336
See application file for complete search history.

(56) References Cited

U.S. PATENT DOCUMENTS

| 4,636,003 A | * | 1/1987 | Siebler ................. 297/336 |
| 4,695,094 A | * | 9/1987 | Siebler ................. 297/331 |
| 4,884,843 A | * | 12/1989 | DeRees ................ 297/331 |
| 4,925,229 A | * | 5/1990 | Siebler ............. 297/331 X |

(Continued)

FOREIGN PATENT DOCUMENTS

| DE | 203 17 023 U1 | 2/2004 |
| FR | 2 704 494 | 11/1994 |

(Continued)

OTHER PUBLICATIONS

Microfilm of the specification and drawings annexed to the request of Japanese Utility Model Application No. 154449/1977 (Laid-open No. 079623/1979) (Toyo Kogyo Co., Ltd.) (Jun. 6, 1979).

*Primary Examiner* — Rodney B White
(74) *Attorney, Agent, or Firm* — Rankin, Hill & Clark LLP

(57) ABSTRACT

Disposed is a seat device wherein a first seat cushion (41) of a first seat (16) is sprung up from a seating position to an upright folded position at a location forward of the seating position. The seat device (15) comprises first vertical leg sections (51, 52) at the front of the first seat cushion (41), these vertical leg sections (51, 52) extending vertically downward. First horizontal sections (54, 55) extend horizontally forward from the lower ends of the first vertical leg sections (51, 52), and are rotatably connected to a first slider (48) which is slidably connected to a fixed rail (35). In the seating position of the first seat cushion (41), the lower ends of the first vertical leg sections (51, 52) are supported by the floor.

13 Claims, 28 Drawing Sheets

(56) References Cited

U.S. PATENT DOCUMENTS

| | | | |
|---|---|---|---|
| 5,839,773 A * | 11/1998 | Ban et al. | 296/65.09 |
| 6,293,603 B1 * | 9/2001 | Waku et al. | 297/334 X |
| 6,648,393 B1 * | 11/2003 | Milnar et al. | 296/65.11 |
| 6,955,386 B2 * | 10/2005 | Rhodes et al. | 297/334 X |
| 6,991,293 B2 * | 1/2006 | Lang et al. | 297/336 |
| 7,066,539 B2 * | 6/2006 | Hatta et al. | 297/334 X |
| 7,686,389 B2 * | 3/2010 | Yamada | 297/334 X |
| 8,496,294 B2 * | 7/2013 | Holdampf et al. | 297/336 X |
| 2004/0075292 A1 | 4/2004 | Rausch | |
| 2006/0284464 A1 * | 12/2006 | Soditch et al. | 297/331 |

FOREIGN PATENT DOCUMENTS

| | | |
|---|---|---|
| JP | 57-118936 | 7/1982 |
| JP | 5-26607 | 4/1993 |
| JP | 10-287157 | 10/1998 |
| JP | 11-005477 | 1/1999 |
| WO | 2010/098196 | 9/2010 |

* cited by examiner

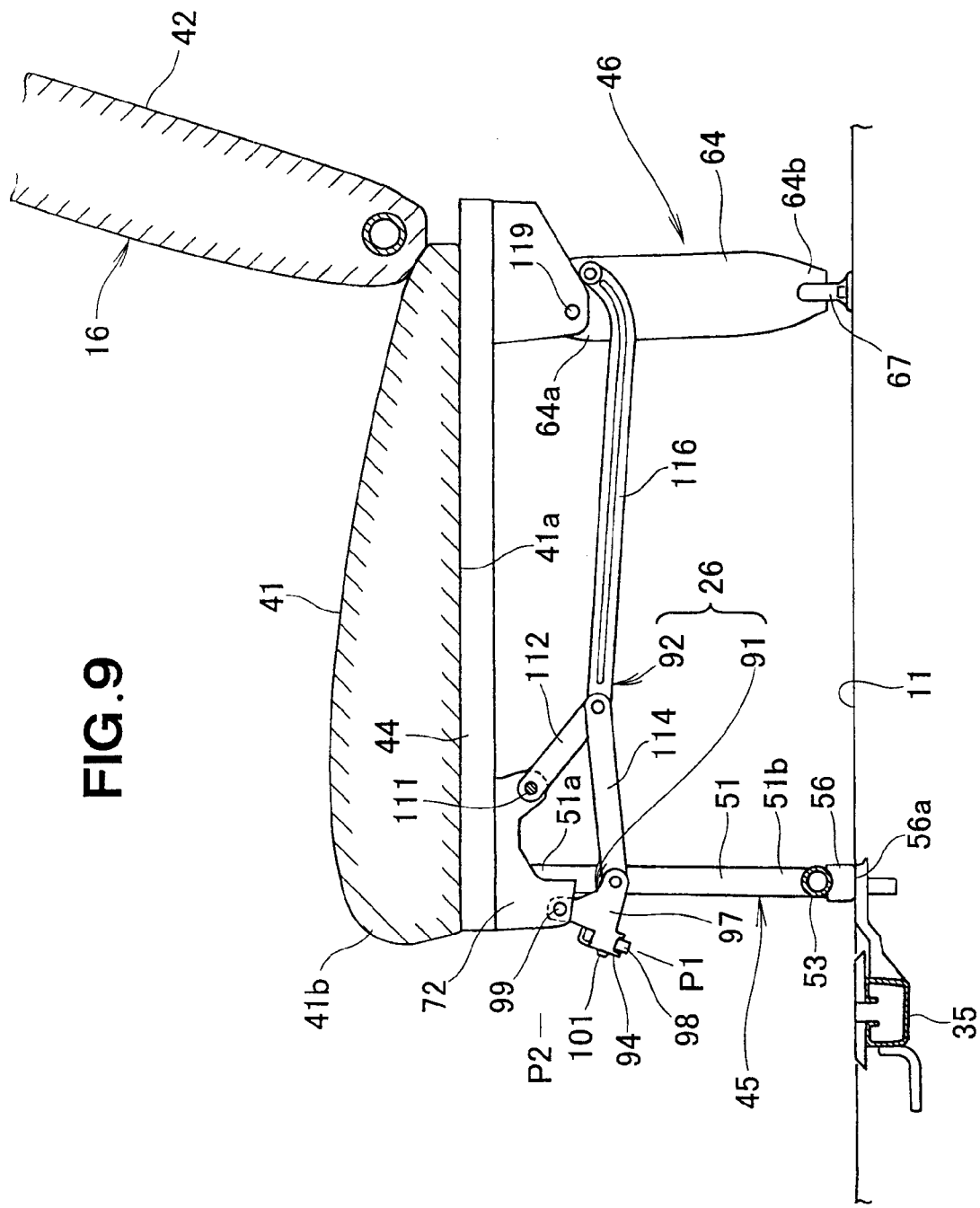

FIG.34
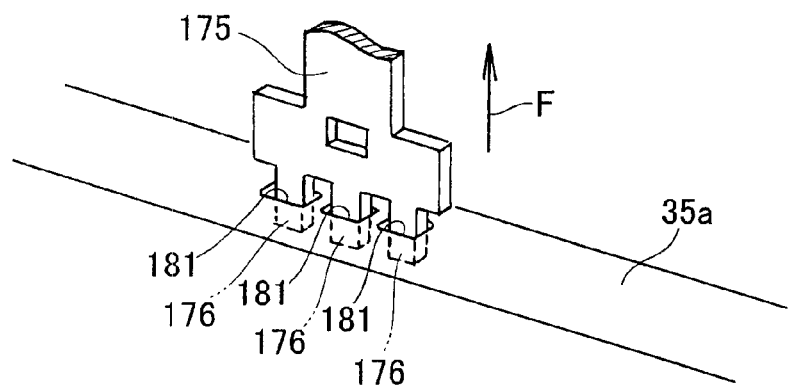
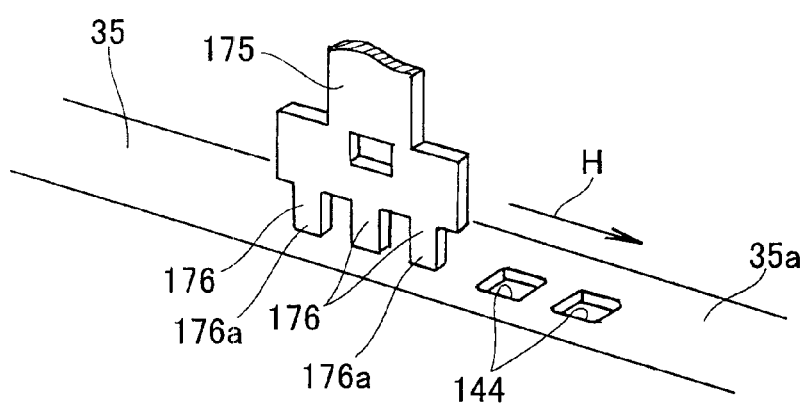
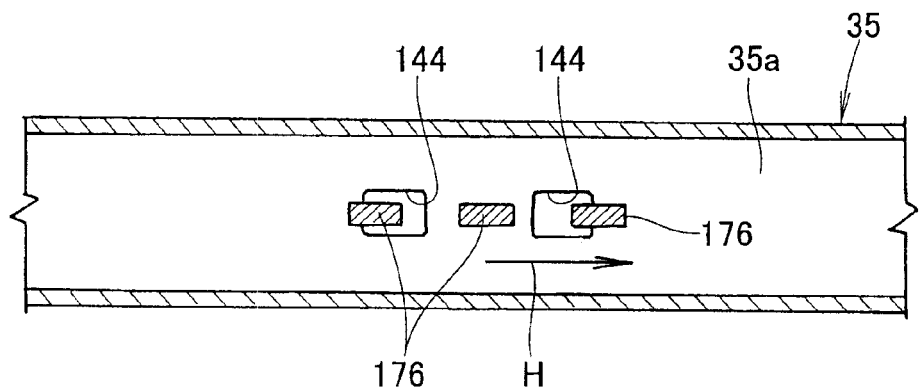

FIG.35
(a)
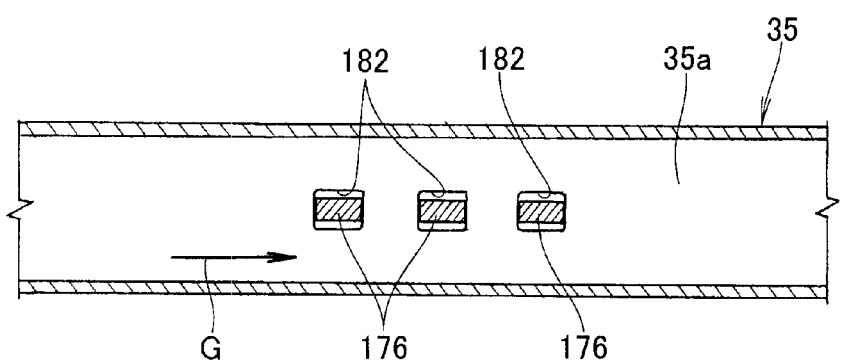
(b)
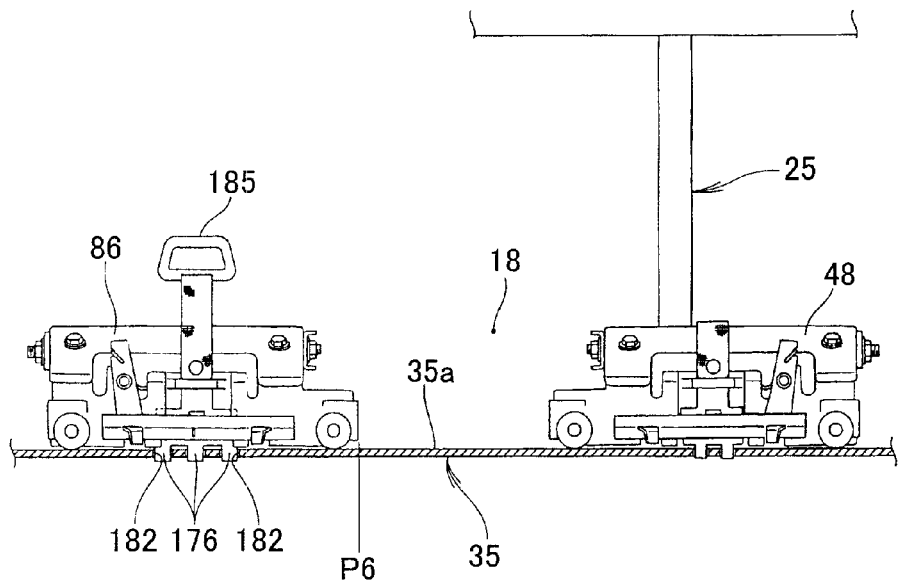

SEAT DEVICE

TECHNICAL FIELD

The present invention relates to a seat assembly including a seat cushion supported in such a manner as to laterally slide as well as to move between a seating position and a stowed position.

BACKGROUND ART

Among known seat assembles is one including a seat cushion and a front leg extending downward from a front portion of the seat cushion and having a lower end pivotably connected via a support shaft (pivot) to a vehicle body floor (as disclosed in e.g., Patent Document 1 below).

In this disclosed seat assembly, a seat cushion with a seat back overlying the seat cushion pivot forward on a pivot into a stowed position in a footrest area.

The pivot or a support bracket must have a high rigidity to support weights of the seat assembly and a person sitting on the seat cushion when the seat assembly is held in a seating position. The need for the high rigidity of the pivot or support bracket makes it difficult to keep the pivot and support bracket compact, and hence the degree of freedom of design is limited.

PRIOR ART LITERATURE

Patent Document: Japanese Utility Model Laid-open Publication No. 5-26607

SUMMARY OF INVENTION

Technical Problem

An object of the present invention is to provide a seat assembly designed to keep a pivot, etc. connected to a front leg.

Solution to Problem

According to a first aspect of the present invention there is provided a seat assembly including first and second seats disposed laterally and a first movement mechanism for allowing a first seat cushion of the first seat to move between a seating position and a stowed position located forward of the seating position, the seat assembly comprising: a fixed rail disposed forward of the first and second seats and extending in a direction along widths of the first and second seats, the fixed rail being supported on a floor supporting the first and second seats; a first slider slidably connected to the fixed rail and supporting the first movement mechanism; and a first front leg including a first vertical leg section extending substantially vertically and having an upper end connected to a front portion of the first seat, and a first horizontal section extending substantially horizontally and forward from a lower end of the first vertical leg section, the first horizontal section having a front portion pivotably connected to the first slider, wherein the lower end of the first vertical leg section is supported by the floor when the first seat is in the seating position.

Since the lower end of the first vertical leg section is supported on the floor, a weight of the first seat and a weight of a person sitting on the first seat cushion can be supported by the lower end of the first vertical leg section positioned rearward than a pivot of the first movement mechanism. Therefore, the weight of the first seat and the weight of the sitting person are not applied to the first slider. Since the first slider need not support the weight of the first seat and the weight of the person, the first slider may be compact. As a result, the degree of freedom to design the seat assembly can be enhanced.

Preferably, the front portion of the first horizontal section is pivotably supported by the first slider via a pivot extending in the direction along the widths of the first and second seats. Therefore, the weight of the first seat and the weight of the sitting person are not applied to the pivot. Since the pivot need not support the weight of the first seat and the weight of the person, the pivot may be compact. As a result, the degree of freedom to design the seat assembly can be enhanced.

Preferably, the first front leg further includes a first elastic member interposed between the lower end of the first vertical leg section and the floor when the first seat is in the seating position. Therefore, the weight of the first seat and the weight of the sitting person can be borne by the elastic member, and the weight of the first seat and the weight of the person can be more advantageously supported by the lower end of the first vertical leg section which is disposed rearward of the pivot.

Preferably, the seat assembly further comprises: a locking mechanism for locking the first slider to the fixed rail; an operation member for unlocking the locking mechanism; and a prevention member for preventing the operation member from unlocking the locking mechanism when the first seat cushion is in the seating position. Therefore, it is possible to reliably prevent the first seat cushion from moving in the lateral direction of the vehicle when the first seat cushion is in the seating position, and convenience of use can be improved.

Preferably, the operation member has an operation strap connected to the locking mechanism for unlocking the locking mechanism by pulling the locking mechanism in a predetermined direction, the prevention member is disposed on a member located on a side of the first seat cushion, and the operation strap is bent in a direction substantially orthogonal to the predetermined direction when the seat cushion is in the seating position. Therefore, the operation of pulling the operation strap in the predetermined direction can be prevented by the prevention member. Since the prevention of the operation of pulling the operation strap in the predetermined direction can be achieved by mere bending of the operation strap through the use of the prevention member, the prevention member may be simple in structure.

Preferably, the seat assembly further comprises a support member movable between a first position located below a bottom surface of the first seat cushion when the first seat cushion of the first seat is held in the seating position and a second position located below a lower end of the first seat cushion when the first seat cushion moves to the stowed position.

The support member is pivotably (swingably) supported by the first seat cushion in such a manner as to move between the first position and second position. More specifically, when the first seat cushion moves to the seating position, the support member is disposed in the first position below the bottom surface of the first seat cushion such that the support member is not an obstacle to a person sitting on the first seat cushion.

Preferably, the seat assembly further comprises a link mechanism interconnecting the support member and a member on the floor side for moving the support member to the second position as the first seat cushion moves forward from the seating position into an upright position, and moving the support member to the first position as the first seat cushion moves from the upright position to the seating position.

When the first seat cushion moves to the upright position, the support member protrudes downward in the second position below the lower end of the first seat cushion. In this second position, the support member abuts on the floor to support the first seat cushion in the upright position. In other words, the headrest need not abut on the floor to support the upright first seat cushion. Therefore, it is possible to prevent the headrest from being soiled, and the external appearance can be improved.

Preferably, the support member comprises a caster capable of rolling along the floor in a lateral direction of a vehicle. Therefore, the first seat cushion in the upright position can be supported by the caster. The caster can roll along the floor to thereby to smoothly stably move the upright first seat cushion along the fixed rail in the lateral direction of the vehicle.

Preferably, the seat assembly further comprises: a locking mechanism for locking the first slider at a predetermined location of the fixed rail in a lateral direction of a vehicle; and a prevention member for preventing the first seat cushion from moving to the seating position when the locking mechanism is in an unlocked position. Therefore, it becomes possible to prevent the first seat cushion from returning to the seating position when the locking mechanism is in any position other than the predetermined position to allow the first seat cushion to return to the seating position. The first seat cushion can be returned to the seating position when the locking mechanism is in the position to allow the first seat cushion to return to the seating position, and hence convenience of use can be improved.

Preferably, the prevention member interferes with the locking mechanism to prevent the first seat cushion from moving to the seating position when the lock mechanism is in the unlocked position. In this manner, the prevention member may be simple in structure because the prevention member prevents movement of the first seat cushion to the seating position merely by interfering with the locking mechanism.

Preferably, the seat assembly further comprises: a second movement mechanism for allowing the second seat to move between a seating position and a stowed position located forward of the seating position; and a second slider slidably connected to the fixed rail and supporting the second movement mechanism.

The second seat and the respective members supporting the second seat are symmetrical to the first seat and the respective members supporting the first seat, and their detailed descriptions are omitted. Also, the second seat and the respective members supporting the second seat provide the same effects as those provided by the first seat and the members supporting the first seat. In other words, the second seat and the members supporting the second sheet are designed such that a weight of second seat and a weight of a person sitting on seated on the second seat cushion can be supported by the lower end of the second vertical leg section disposed rearward of the pivot of the second movement mechanism, and the second slider can be made more compact, whereby the degree of freedom to design is enhanced.

In the first seat, since the front portion of the first horizontal section is pivotably connected to the first slider, the first vertical leg section is disposed rearward of the first slider. Accordingly, it becomes possible to prevent the second slider from interfering with the first vertical leg section as the second seat in the stowed position (upright position) moves along the fixed rail to a point forward of the first seat. Therefore, the degree of freedom to determine the shape of the first vertical leg section can be enhanced. The shape of the first vertical leg section can be determined so that the weight of the first seat and the weight of the sitting person can be adequately supported.

Preferably, the seat assembly further comprises a second front leg including a second vertical leg section extending substantially vertically and having an upper end connected to a front portion of the second seat, and a second horizontal section extending substantially horizontally and forward from a lower end of the second vertical leg section, the second horizontal section having a front portion pivotably connected to the second slider, wherein the lower end of the second vertical leg section is supported by the floor when the second seat is in the seating position.

The second seat and the respective members supporting the second seat are symmetrical to the first seat and the respective members supporting the first seat as described above, and their detailed descriptions are omitted. Also, the second seat and the respective members supporting the second seat provide the same effects as those provided by the first seat and the respective members supporting the first seat.

In the second seat and the members supporting the second seat, namely, the front portion of the second horizontal section is pivotably connected to the second slider, and hence the second vertical leg section is disposed rearward of the second slider. The shape of the second vertical leg section can be determined so that the weight of the second seat and the weight of the seated person can be adequately supported.

BRIEF DESCRIPTION OF DRAWINGS

FIG. 9 is a cross-sectional view taken along line 9-9 of FIG. 3;

FIG. 34 is a view showing movement of the lock member as the second seat moves toward a stowed position;

FIG. 35 is a view showing how the second seat is locked in the stowed position.

DESCRIPTION OF EMBODIMENTS

The preferred embodiments of the present invention are described below with reference to the accompanying drawings.

Embodiment

Figure 1:
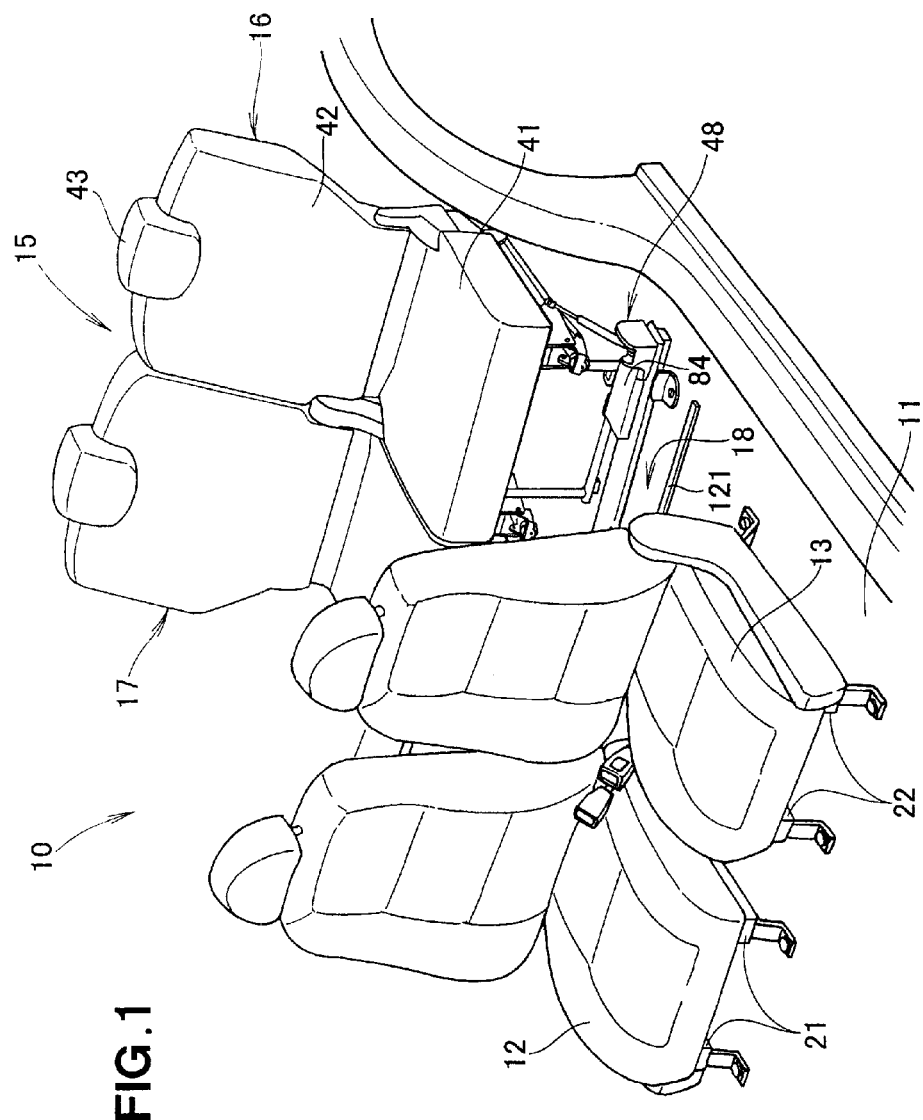
FIG. 1 is a perspective view of an interior of a vehicle including a seat assembly according to the present invention.

As shown in FIG. 1, a vehicle 10 includes a driver's seat 12 disposed on a vehicle body floor 11, a passenger seat 13 disposed inner-by-side relation to the driver's seat 12 in a lateral direction of the vehicle, and a seat assembly 15 disposed behind the driver's seat 12 and the passenger seat 13.

The driver's seat 12 is supported on the floor 11 via inner and outer slide rails 21 such that the seat 12 can slide on the inner and outer slide rails 21 in a longitudinal direction of a vehicle body.

The passenger seat 13 is supported on the floor 11 via inner and outer slide rails 12 such that the seat 13 can slide on the inner and outer slide rails 12 in the longitudinal direction of the vehicle body, as in the driver's seat 12.

The seat assembly 15 includes a left rear seat (first seat) 16 disposed behind the passenger seat 13, and a right rear seat (second seat) 17 disposed behind the driver's seat 12.

The first seat 16 and the second seat 17 are disposed side-by-side in the lateral direction of the vehicle (in a direction along widths of the seats). A left foot space 18 is formed between the passenger seat 13 and the first seat 16. A right foot space 19 (see FIG. 2) is formed between the second seat 17 and the driver's seat 12.

The vehicle 10 defines openings at lateral sides thereof corresponding to the first and second seats 16, 17, and includes sliding doors 23 (see FIG. 33) movable in a longitudinal direction of the vehicle body between an open position to open the openings and a closed position to close the openings. Rearward movement of the sliding doors 23 to the open position allows passengers to go into and out of the vehicle.

A luggage compartment 24 (see FIG. 33) is defined behind the first seat 16 and the second seat 17, and a tailgate 28 (see FIG. 33) movable between an open position to open an opening defined behind the luggage compartment 24 (an opening defined by a rear of the vehicle body) and a closed position to close the opening. As the tailgate 28 is in the open position, luggage is loaded into or unloaded from the luggage compartment 24 through the opening.

Figure 2:
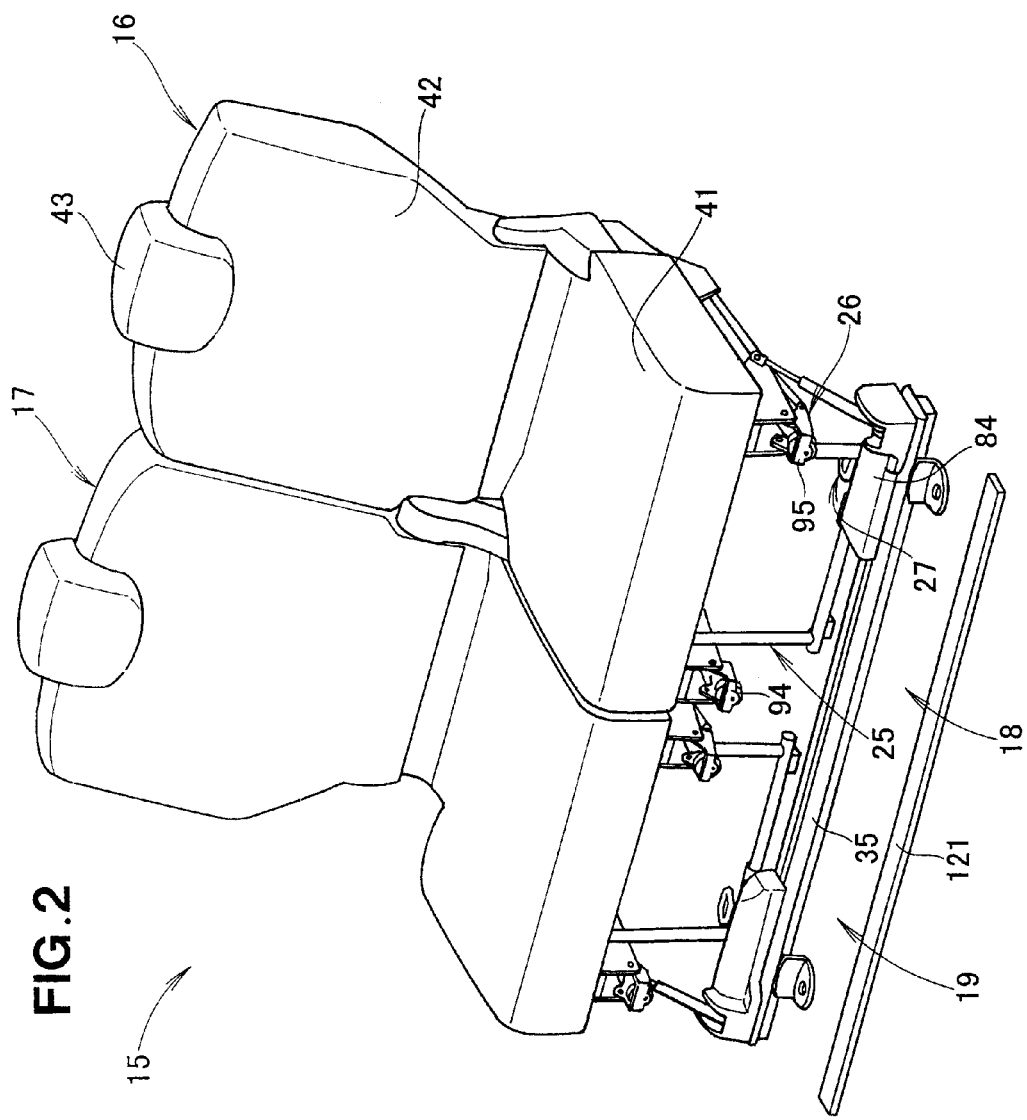
FIG. 2 is a perspective view of the seat assembly shown in FIG. 1.
Figure 3:
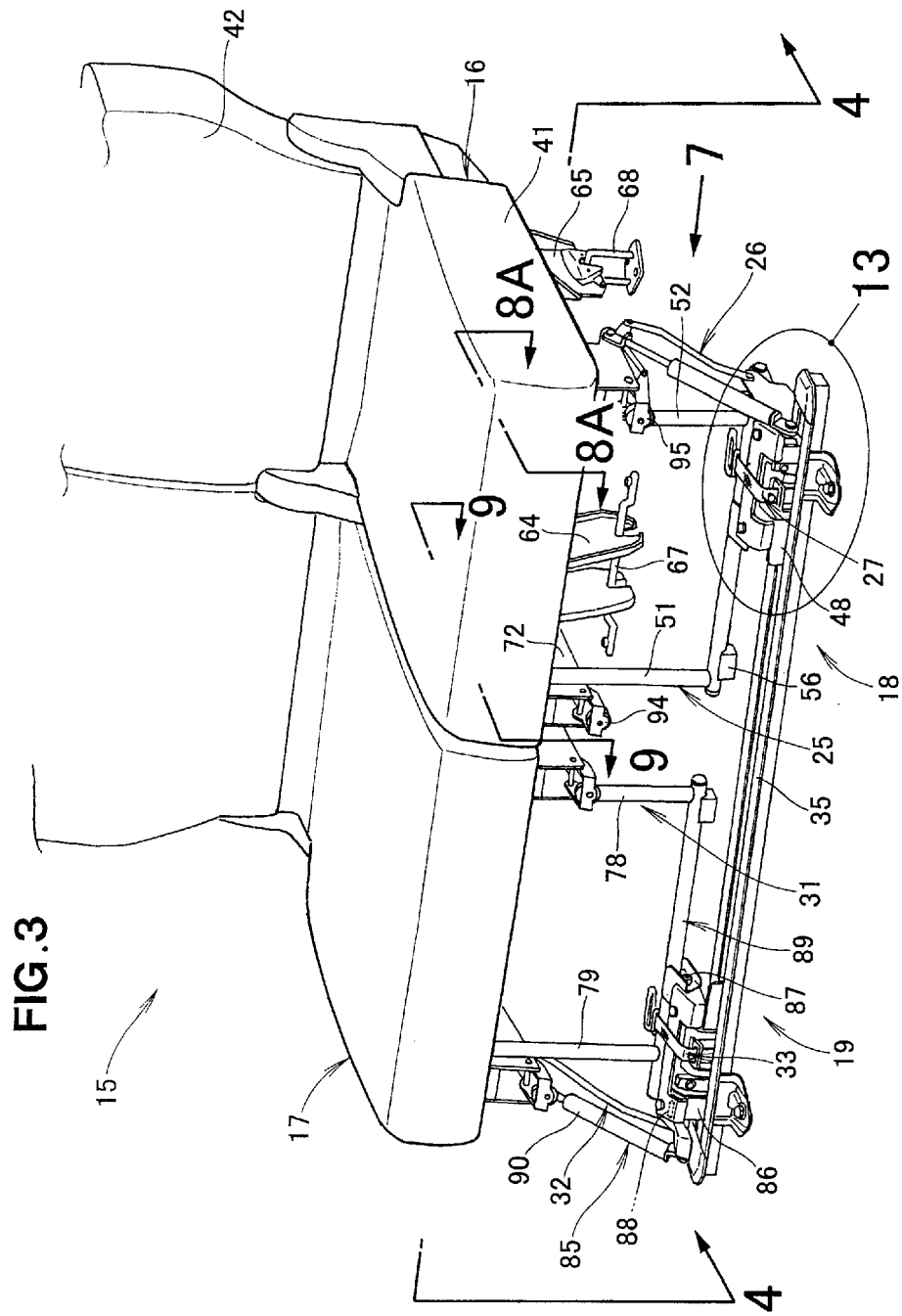
FIG. 3 is a perspective view of the seat assembly with a cover removed from a slider shown in FIG. 2.
Figure 4:
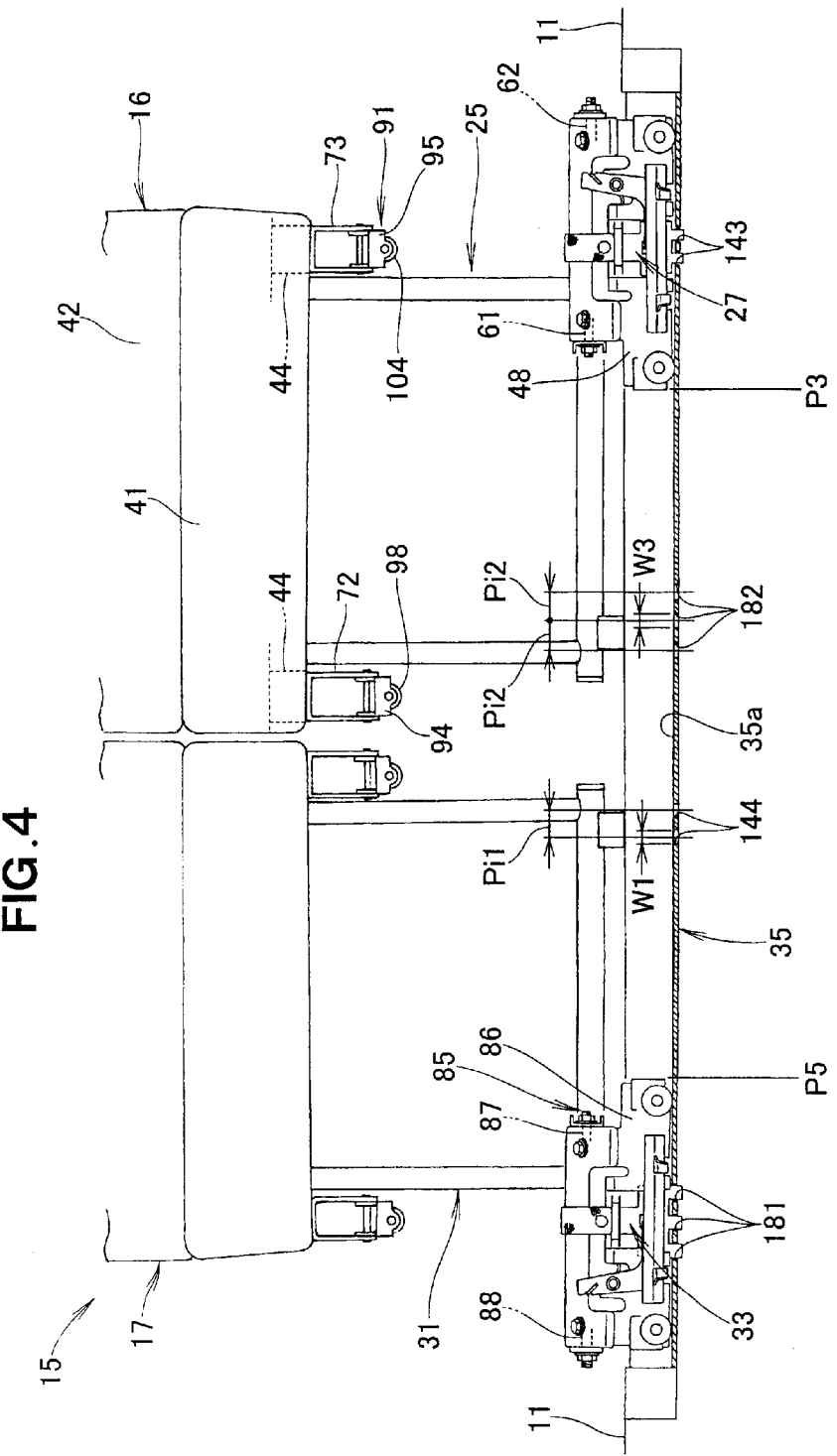
FIG. 4 is a cross-sectional view taken along line 4-4 of FIG. 3.

As shown in FIG. 2 to FIG. 4, the seat assembly 15 includes a left leg mechanism 25 for supporting the first seat 16, a left support mechanism 26 for supporting the first seat 16 in such a manner as to allow the first seat 16 to move in the lateral direction of the vehicle, a left locking/unlocking system 27 for holding the first seat 16 at a predetermined location in the lateral direction of the vehicle, a right leg mechanism 31 for supporting the second seat 17, a right support mechanism 32 for supporting the second seat 17 in such a manner as to allow the second seat 17 to move in the lateral direction of the vehicle, a right locking/unlocking system 33 for holding the second seat 17 in a predetermined location in the lateral direction of the vehicle, and a fixed rail 35 for guiding the left and right leg mechanisms 25, 31 in the lateral direction of the vehicle body (in the direction along the widths of the seats).

A left slider 48 of the left leg mechanism 25 is disposed on a left side of the fixed rail 35.

A right slider 86 of the right leg mechanism 31 is disposed on a right side of the fixed rail 35.

The right leg mechanism 31, the right support mechanism 32 and the right locking/unlocking system 33 are arranged in symmetric relation to the left leg mechanism 25, the left support mechanism 26 and the left locking/unlocking system 27. A detailed description of the respective mechanisms 31, 32, 33 is omitted.

The first seat 16 includes a left seat cushion (first seat cushion) 41 on which a vehicle occupant sits, a left seat back 42 connected to the left seat cushion 41 in such a manner as to pivot in the longitudinal direction of the vehicle body, a left headrest 43 disposed on the upper portion of the left seat back 42, and inner and outer left slide rails 44 (see also FIG. 4) disposed on the bottom of the left seat cushion 41.

The second seat 17 is identical in structure to the first seat 16, and hence its detailed description is omitted.

Figure 5:
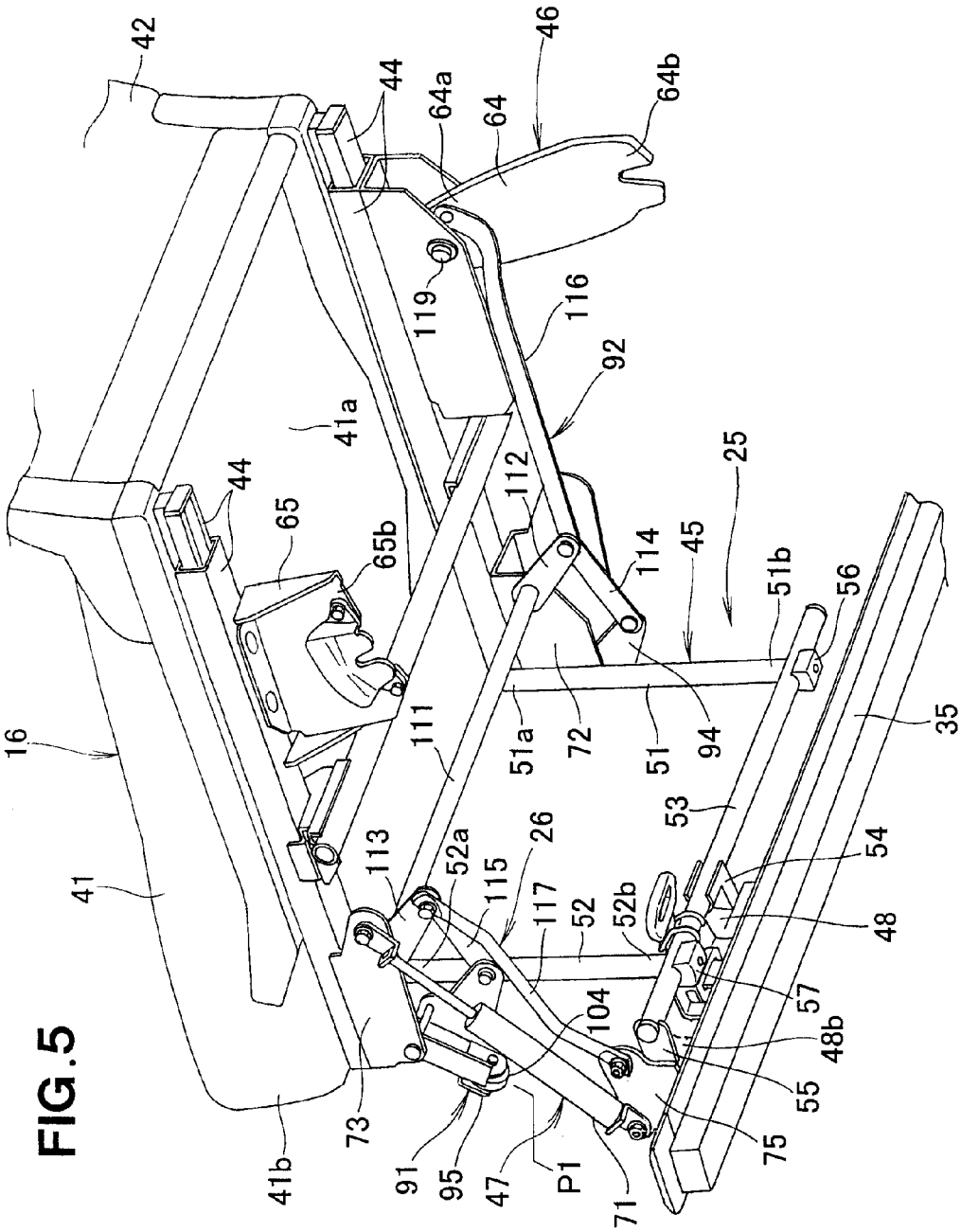
FIG. 5 is a lower rear perspective view of a left side of the seat assembly.
Figure 6:
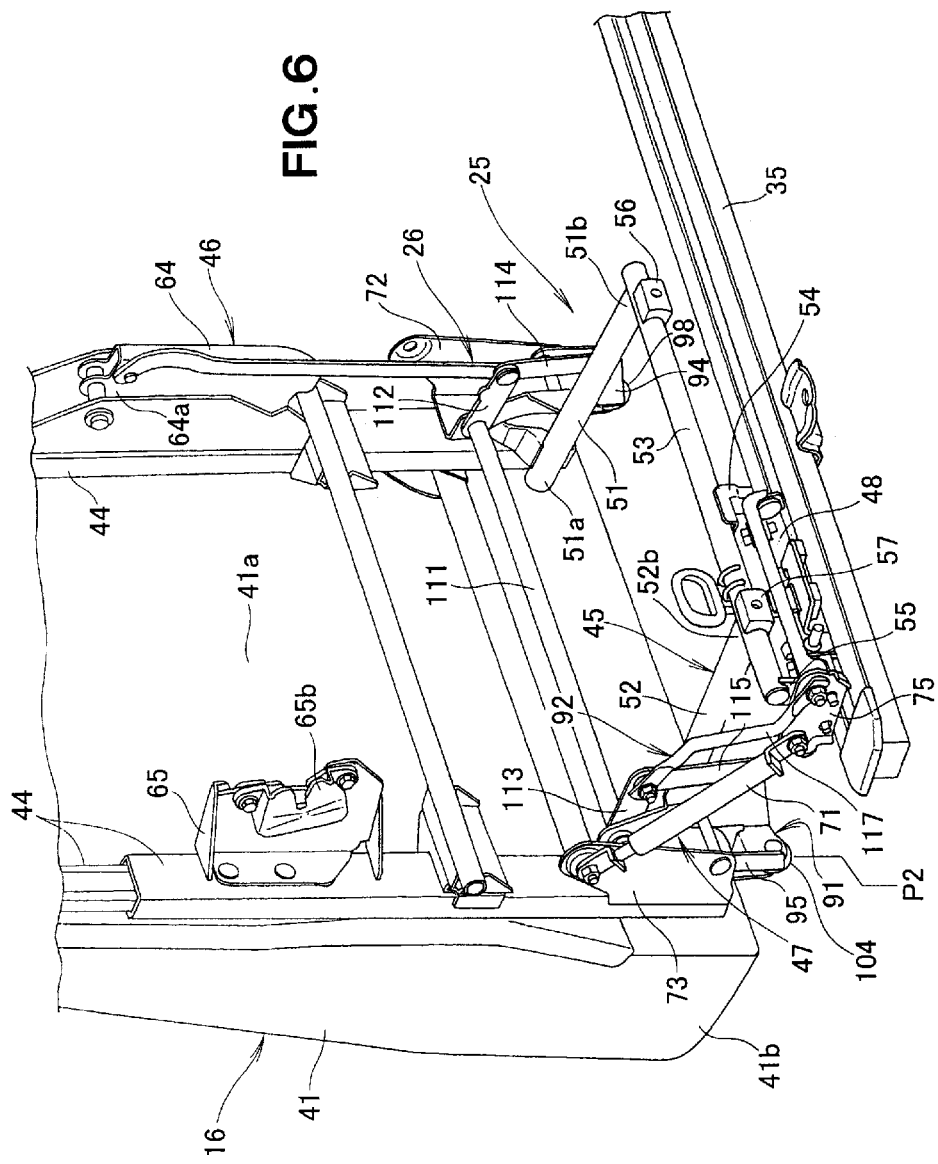
FIG. 6 is a perspective view of a first seat of FIG. 5 as the first seat is in an upright position.

As shown in FIG. 5 and FIG. 6, the left leg mechanism 25 includes a left front leg (first front leg) 45 connected to front portions of the inner and outer left slide rails 44, 44, left rear legs (generally designated at 46) connected to a rear portion of the inner left slide rail 44, a left movement mechanism (first movement mechanism) 47 for allowing the first seat 16 to move between a seating position and a stowed position (upright position), and the left slider (first slider) 48 slidably connected to the fixed rail 35 and supporting the left movement mechanism 47.

The left front leg 45 includes an inner vertical leg section (first vertical leg section) 51 extending substantially vertically downward. The inner vertical leg section 51 has an upper end 51*a* connected to the front portion of the inner left slide rail 44. The left front leg 45 also includes an outer vertical leg section (first vertical leg section) 52 extending substantially vertically downward. The outer vertical leg section 52 has an upper end 52*a* connected to the front portion of the outer left slide rail 44. The left front leg 45 includes a horizontal leg section 53 interconnecting lower ends 51*b*, 52*b* of the inner and outer vertical leg sections 51, 52. The left front leg 45 includes inner and outer horizontal sections (first horizontal sections) 54, 55 (see also FIG. 8A and FIG. 8B) extending substantially horizontally and forward from the left horizontal leg section 53. The left front leg 45 includes inner and outer support members (elastic members) 56, 57 disposed on the left horizontal leg section 53.

The left horizontal front leg section 53 is a substantially horizontal rod-shaped member interconnecting the lower ends 51*b*, 52*b* of the inner and outer vertical leg sections 51, 52.

The inner and outer horizontal sections 54, 55 are connected via the left horizontal leg section 53 to the lower ends 51*b*, 52*b* of the inner and outer left vertical leg section 51, 52.

Figure 7:
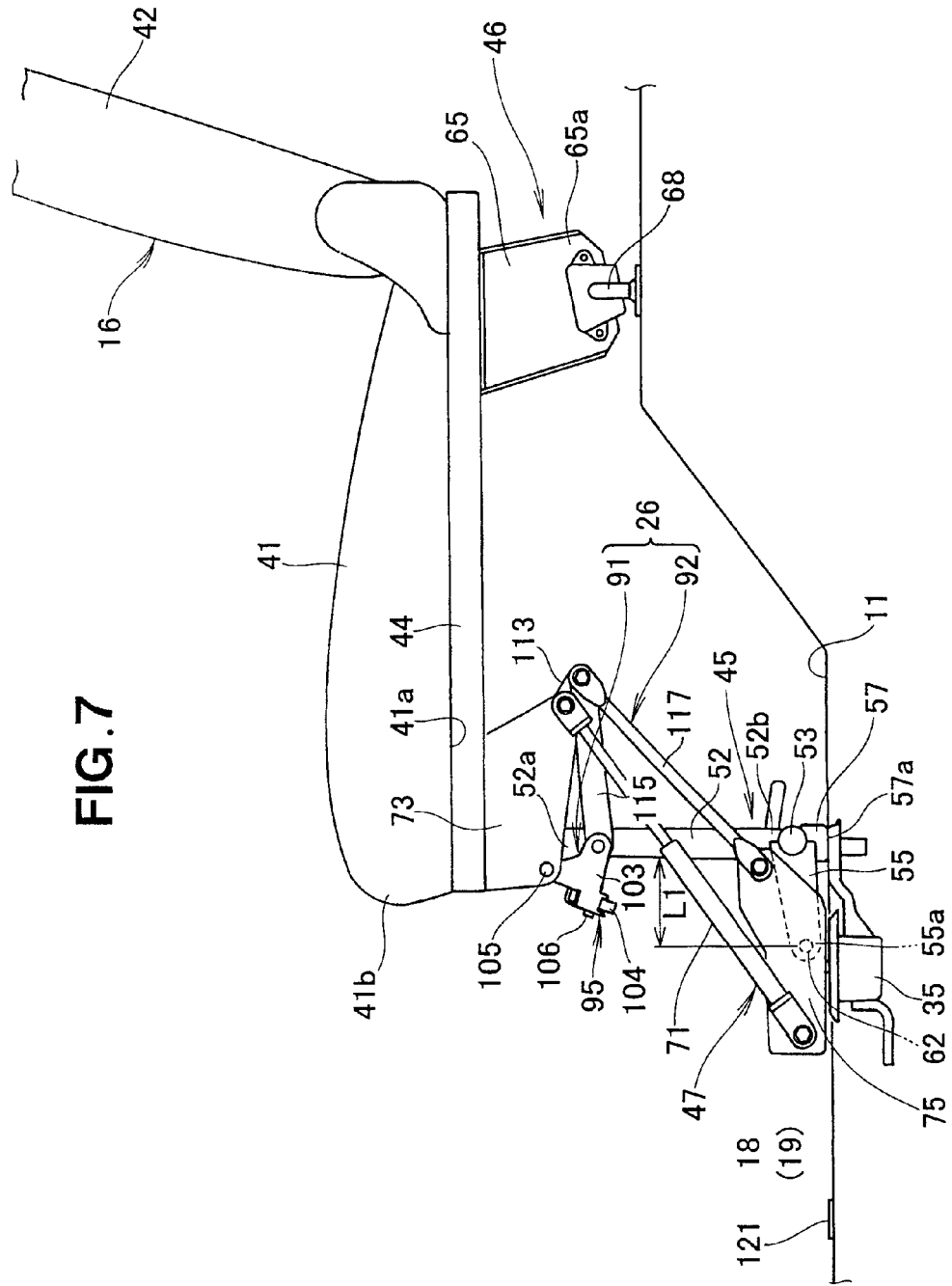
FIG. 7 is a view of the seat assembly when viewed in a direction of an arrow 7 of FIG. 3.
Figure 8A:
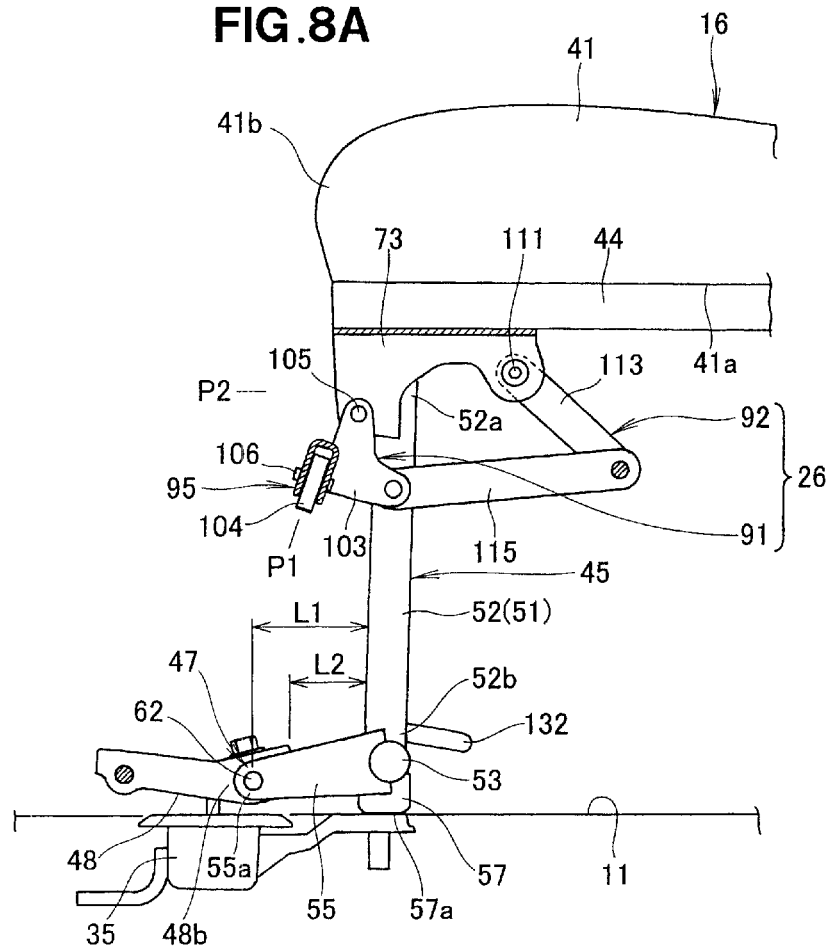
FIG. 8A is a cross-sectional view taken along line 8A-8A of FIG. 3.

More specifically, the outer horizontal section 55 substantially horizontally extends a distance L1 measured from the lower end 52*b* of the outer vertical leg section 52, as shown in FIG. 7 and FIG. 8A. The outer horizontal section 55 has a front portion 55*a* pivotably connected via an outer pivot 62 to an outer portion 48*b* of the left slider 48.

Figure 8B:
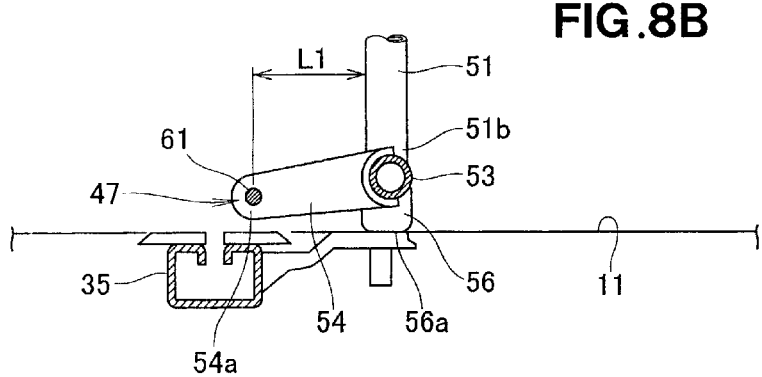
FIG. 8B is a cross-sectional view of an inner horizontal section shown in FIG. 8A.

Likewise, the inner horizontal section 54 substantially horizontally extends a distance L1 measured from the lower end 51*b* of the inner left front vertical leg section 51, as shown in FIG. 8B. The inner horizontal section 54 has a front portion 54*a* pivotably connected via an inner pivot 61 to an inner portion 48*a* (FIG. 13) of the left slider 48.

The inner and outer pivots 61, 62 pivotably support a front portion 41*b* of the left seat cushion 41 via the left front leg 45.

As shown in FIG. 8A and FIG. 8B, the inner horizontal section 54 is connected to the lower end 51*b* of the inner vertical leg section 51 via the horizontal leg section 53, and the outer horizontal section 55 is connected to the lower end 52*b* of the outer vertical leg section 52 via the left horizontal leg section 53.

In other words, the inner and outer horizontal sections 54, 55 extend substantially horizontally forward toward the left slider 48 from points horizontally aligned with the lower ends 51*b*, 52*b* of the inner left vertical leg section 51 and the outer vertical leg section 52. The inner and outer vertical leg sections 51, 52 are offset rearward from a rear end of the left slider 48 by a distance L2.

As shown in FIG. 7 and FIG. 9, the left rear legs 46 includes an inner leg 64 having an upper end 64*a* pivotably connected to the rear portion of the inner left slide rail 44, and an outer leg 65 disposed on the rear portion of the outer left slide rail 44.

The inner leg 64 has a lower end 64*b* releasably attached to a left inner striker 67 (FIG. 3).

The outer leg 65 has a lower end 65*a* releasably attached to a left outer striker 68 (FIG. 3).

The inner and outer legs 64, 65 are detached from the strikers 67, 68, respectively, when a reclining lever is operated to fold the left seat back 42 down onto the left seat cushion 41 to release locking lugs (not shown) of the lower ends 64*b*, 65*b* from the left inner and outer strikers 67, 68.

As shown in FIGS. 7, 8A, and 8B, the left movement mechanism 47 includes the inner pivot 61 pivotably connecting the front portion 54*a* of the inner horizontal section 54 to the inner portion 48*a* of the left slider 48, and the outer pivot 62 pivotably connecting the front portion 55*a* of the outer horizontal section 55, and a damper 71 (FIG. 5) for allowing smooth movement of the first seat 16 (between the seating position and the stowed position).

The inner and outer pivots 61, 62 are connected to the left slider 48 and extend in the lateral direction of the vehicle. Pivotal movement of the left front leg 45 on the pivots 61, 62 causes the first seat 16 to swing between the seating position (see FIG. 1 and FIG. 5) and the stowed position (FIG. 6).

As shown in FIG. 5 and FIG. 6, the damper 71 interconnects an outer attachment bracket 73 and an outer support bracket 75 for damping an impact generated when the first seat 16 moves between the seating position and the stowed position. The damper 71 thus allows for smooth movement of the first seat 16 between the seating position and the stowed position.

The outer attachment bracket 73 is disposed on the front portion of the outer left slide rail 44, and the front portion defines a front outer corner of a bottom surface 41*a* of the left seat cushion 41.

The outer support bracket 75 is disposed on the outer portion 48*b* (FIG. 13) of the left slider 48.

The seating position refers to a state in which the left seat cushion 41 of the first seat 16 is substantially horizontally oriented to allow a person to sit on the left seat cushion 41 (FIG. 9).

Figure 10:
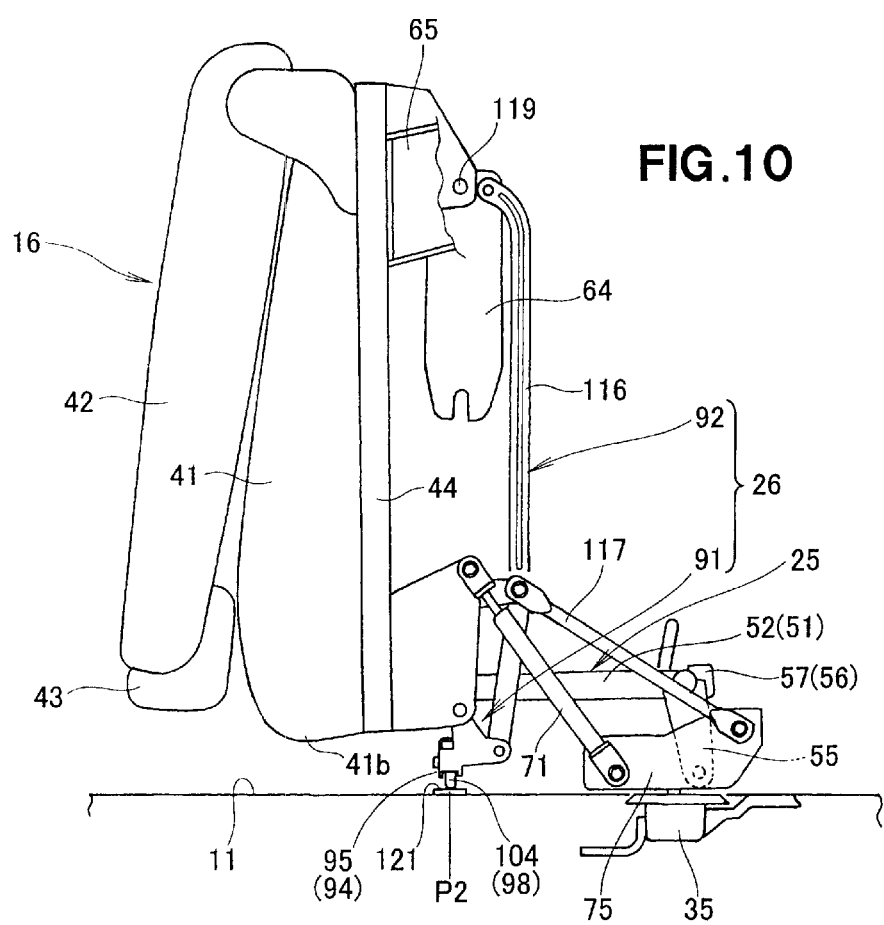
FIG. 10 is a side view of the first seat as the first seat is in the upright position.

The stowed position refers to a state in which the left seat cushion 41 and the left seat back 42 folded down onto the left seat cushion 41 pivot 90 degrees into an upright position (FIG. 10).

As shown in FIG. 5, the inner and outer support members 56, 57 are interposed between the horizontal front leg section 53 and the floor 11 (FIG. 7) when the seat 16 is in the seating position.

The horizontal leg section 53 extends between and interconnects the lower ends 51*b*, 52*b* of the left inner vertical leg section 51 and the outer vertical leg section 52. The left horizontal front leg section 53 and the inner support member 56 are interposed between the lower end 51*b* of the inner vertical leg section 51 and the floor 11, and the left horizontal leg section 53 and the outer support member 57 are interposed between the lower end 52*b* of the outer vertical leg section 52 and the floor 11.

The inner support member 56, which is disposed on the horizontal leg section 53 and below the inner vertical leg section 51, is an elastic member made of, for example, rubber. The outer support member 57, which is disposed on the horizontal leg section 53 and below the outer vertical leg section 52, is an elastic member made of, for example, rubber.

As shown in FIG. 7, FIG. 8A, and FIG. 8B, the inner and outer support members 56, 57, which are interposed between the left horizontal leg section 53 and the vehicle body floor 11, have bottom portions 56*a*, 57*a* abutting on the floor 11. With the bottom portions 56*a*, 57*a* abutting on the floor 11, the horizontal leg section 53 is supported by the vehicle body floor 11 via the inner and outer support members 56, 57.

In other words, the lower end 51*b* of the inner vertical leg section 51 is supported by the floor 11 via the horizontal leg section 53 and the inner support member 56, and the lower end 52*b* of the outer vertical leg section 52 is supported by the floor 11 via the horizontal leg section 53 and the inner support member 56. Accordingly, the first seat 16 is supported by the floor 11 via the inner vertical leg section 51, the outer vertical leg section 52, the horizontal leg section 53, the inner support member 56 and the outer support member 57.

Since the lower end 51*b* of the inner vertical leg section 51 and the lower end 52*b* of the outer vertical leg section 52 are supported on the floor 11, the weight of the first seat 16 and the weight of a person sitting on the left seat cushion 41 are borne by the lower ends 51b, 52b.

The lower ends 51b, 52b of the inner and outer vertical leg sections 51, 52 are positioned rearward of the inner and outer pivots 61, 62, such that the weight of the first seat 16 and the weight of the sitting person are not applied to the inner and outer pivots 61, 62 and the left slider 48. Therefore, the inner and outer rotating shafts 61, 62 and the left slider 48 are kept compact, and the degree of freedom of design is improved.

The inner and outer support members 56, 57, which are elastic members, bear a weight of the first seat 16 and a weight of a person sitting on the first seat 16.

Figures 13, 14:
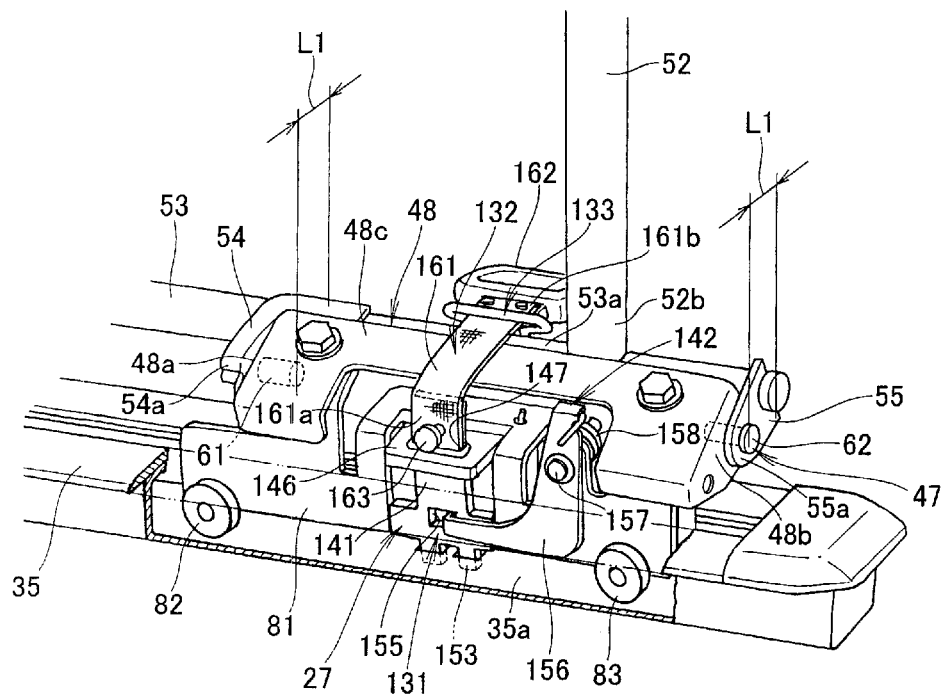
FIG. 13 is an enlarged view of a left locking mechanism encircled by reference numeral 13 of FIG. 3.
FIG. 14 is a perspective view of a left prevention member shown in FIG. 13.
Figure 15:
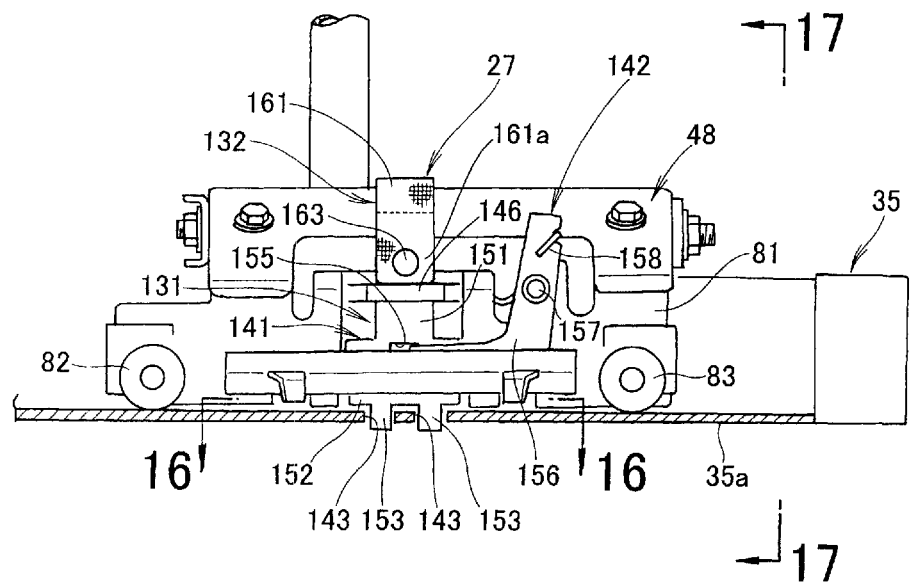
FIG. 15 is a front side view of the left locking mechanism shown in FIG. 13.

As shown in FIG. 13, the inner and outer pivots 61, 62 are provided to the left slider 48. The left slider 48 is slidable on the fixed rail 35 in the lateral direction of the vehicle.

The left slider 48 includes a slider body 81, an inner roller 82 rotatably disposed on an inner end portion of the slider body 81, and an outer roller 83 rotatably disposed on an outer end portion of the slider body 81. The slider body 81 is covered by a cover 84 (FIG. 1).

The inner and outer rollers 82, 83 roll along a bottom portion 35a of the fixed rail 35, whereby the left slider 48 moves along the fixed rail 35 in the lateral direction of the vehicle.

As shown in FIG. 3, FIG. 4, and FIG. 7, the fixed rail 35, which extending in the lateral direction of the vehicle, has a top located in substantially flush with the floor 11. The fixed rail 35 is located in the left foot space 18 of the first seat 16 and the right foot space 19 of the second seat 17. The left and right sliders 48, 86 are slidably supported by the fixed rail 35.

As shown in FIG. 4, two first locking holes 143 and two second locking holes 144 of the left locking/unlocking system 27 are formed in the bottom portion 35a of the fixed rail 35. Furthermore, three first locking holes 181 and three second locking holes 182 of the right locking/unlocking system 33 are formed in the bottom section 35a of the fixed rail 35. The first and second locking holes 143, 144 and the first and second locking holes 181, 182 are later described in detail.

As shown in FIG. 3, the right slider (second slider) 86 is connected to the second seat 17 via inner and outer pivots 87, 88 and a right front leg (second front leg) 89, as in the left slider 48. Sliding of the left slider 48 along the fixed rail 35 guides the first seat 16 in the lateral direction of the vehicle. Likewise, sliding of the right slider 86 guides the second seat 17 in the lateral direction of the vehicle.

The inner and outer pivots 87, 88 and a damper 90 form a right movement mechanism 85. The right movement mechanism 85 is symmetrical to the left movement mechanism 47.

As shown in FIG. 7 to FIG. 9, the left support mechanism 26 includes left caster members (support members) generally designated at 91 for supporting the first seat 16 in such a manner as to allow the first seat 16 to move in the lateral direction of the vehicle, and a left link mechanism 92 for swinging (moving) the left caster members 91 between a retracted position (first position) P1 and a support position (second position) P2.

As shown in FIG. 4 and FIG. 9, the left caster members 91 include an inner caster 94 and an outer caster 95 on the lower surface 41a of the left seat cushion 41. The inner caster 94 is connected to an inner attachment bracket 72 in such a manner as to pivot (turn) in the longitudinal direction of the vehicle. The outer caster 95 is connected to an outer attachment bracket 73 in such a manner as to pivot (turn) in the longitudinal direction of the vehicle.

As shown in FIG. 9, the inner attachment bracket 72 is disposed on the front portion of the left inner slide rail 44, and the front portion of the left inner slide rail 44 defines an inner front corner of the lower surface 41a of the left seat cushion 41. The inner caster 94 includes a pivotable bracket 97 connected to the inner attachment bracket 72 in such a manner as to pivot in the longitudinal direction of the vehicle, and a caster body 98 rotatably supported by the pivotable bracket 97.

The pivotable bracket 97 is connected to the inner attachment bracket 72 in such a manner as to pivot on an inner support pin 99 in the longitudinal direction of the vehicle. The caster body 98 is rotatably attached to the pivotable bracket 97 via a support shaft 101. The support shaft 101 is oriented in a direction orthogonal to the lateral direction of the vehicle, and hence the caster body 98 is disposed in parallel to the lateral direction of the vehicle.

As shown in FIG. 7 and FIG. 8A, the outer attachment bracket 73 is disposed on the front portion of the left outer slide rail 44, and the front portion of the left outer slide rail 44 defines an outer front corner of the lower surface 41a of the left seat cushion 41. The outer caster 95 includes a pivotable bracket 103 connected to the outer attachment bracket 73 in such a manner as to pivot in the longitudinal direction of the vehicle, and a caster body 104 rotatably supported by the pivotable bracket 103.

The pivotable bracket 103 is connected to the outer attachment bracket 73 in such a manner as to pivot on an outer support pin 105 in the longitudinal direction of the vehicle, as in the pivotable bracket 97 of the inner caster 94. The caster body 104 is rotatably attached to the pivotable bracket 103 via a support shaft 106. The support shaft 106 is oriented in a direction orthogonal to the lateral direction of the vehicle, and hence the caster body 104 is disposed in parallel to the lateral direction of the vehicle, as in the caster body 98 of the inner caster 94.

As shown in FIG. 7 to FIG. 9, the left link mechanism 92 holds the left caster members 91 in the retracted position P1 when the left seat cushion 41 is held in the seating position, and holds the left caster members 91 in the support position P2 when the left seat cushion 41 is in the stowed position.

The left link mechanism 92 includes a connecting rod 111 interconnecting the inner attachment bracket 72 and the outer attachment bracket 73, an inner arm 112 disposed on an inner end portion of the connecting rod 111, an outer arm 113 disposed on an outer end portion of the connecting rod 111, an inner lever 114 connected to the pivotable bracket 97 to which are attached the inner arm 112 and the inner caster 94, a connecting arm 116 connected to distal ends of the inner arm 112 and the inner lever 114 and to the upper end 64a of the inner leg 64, an outer lever 115 connected to the pivotable bracket 103 and the outer arm 113, and a connecting lever 117 connected to distal ends of the outer arm 113 and the outer lever 115) and to the outer support bracket 75.

The outer caster 95 (the pivotable bracket 103) is connected to the left slider 48 via the left link mechanism 92 (the outer lever 115 and the connecting lever 117) and the outer support bracket 75.

The inner caster 94 (the pivotable bracket 97) is connected to the left slider 48 via the left link mechanism 92 (the inner lever 114, the inner arm 112, the connecting rod 111, the outer arm 113, and the connecting lever 117) and the outer support bracket 75.

The left link mechanism 92 causes the inner and outer casters 94, 95 to move (pivot) from the retracted position P1 to the support position P2 as the first seat 16 moves from the seating position to the stowed position (FIG. 10).

The left link mechanism 92 causes the left inner rear leg 64 to pivot forward relative to the first seat 16 as the first seat 16 moves from the seating position to the stowed position.

Figure 11:
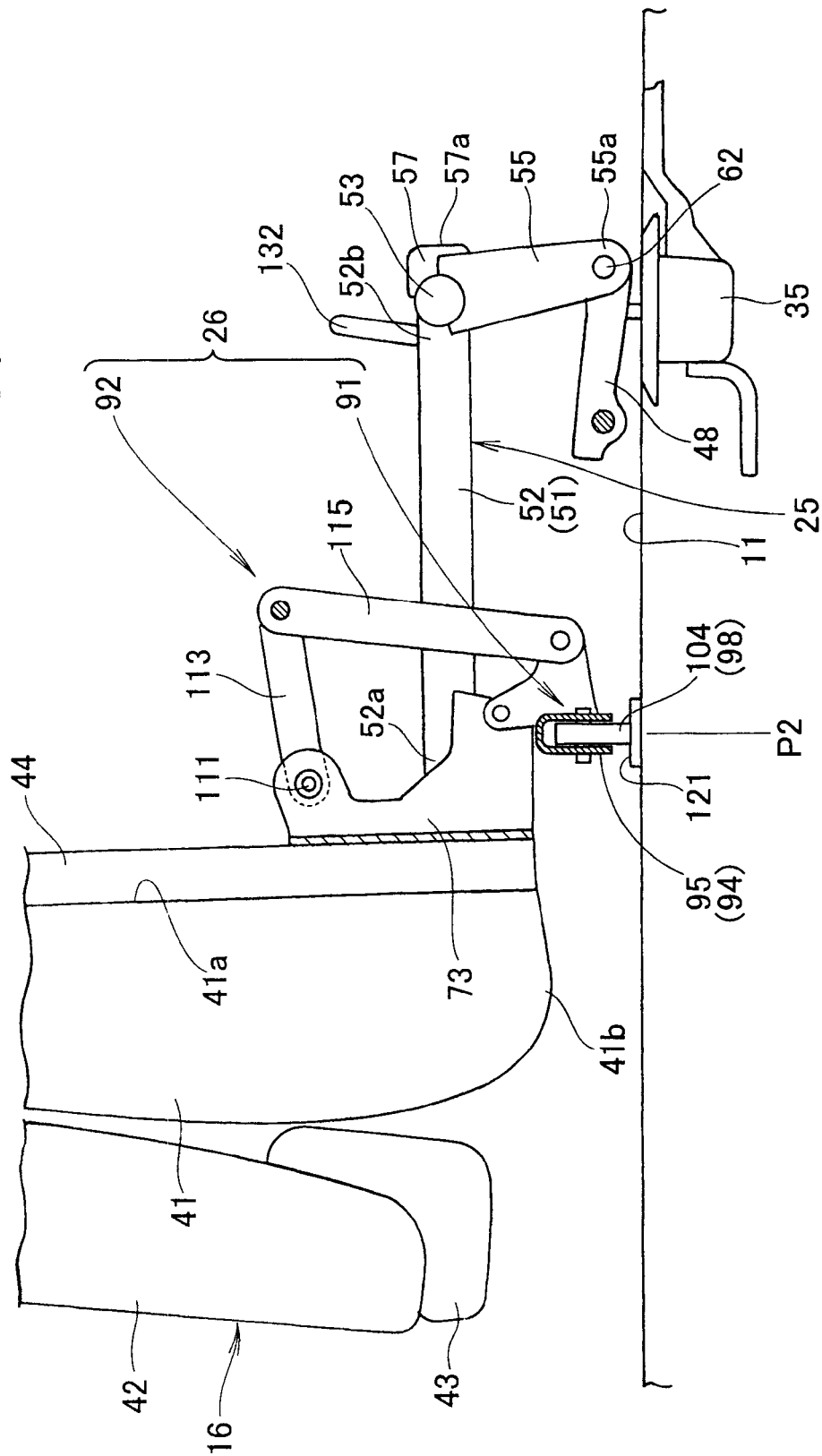
FIG. 11 is an enlarged view of a lower side of the seat assembly shown in FIG. 10.

As shown in FIG. 10 and FIG. 11, the inner and outer casters 94, 95 are held in the support position P2 with the first seat 16 held in the stowed position (upright position). The inner rear leg 64 is forward pivoted by the left link mechanism 92 on a left leg support shaft 119 as the first seat 16 moves from the seating position to the stowed position.

As the first seat 16 moves from stowed position (upright position) to the seating position, on the other hand, the inner and outer casters 94, 95 move (pivot) from the support position P2 to the retracted position P1 (FIG. 8A).

As shown in FIG. 8A and FIG. 9, the inner and outer casters 94, 95 are held in the retracted position P1 with the first seat 16 held in the seating position.

When in the retracted position P1, the inner and outer casters 94, 95 are disposed below the lower surface 41a of the left seat cushion 41, as shown in FIG. 8A, such that the inner and outer casters 94, 95 are not obstacles to a person sitting on the left seat cushion 41 held in the seating position.

When in the support position P2, on the other hand, the inner and outer casters 94, 95 is disposed in downward orientation below the lower end (front portion) 41b of the left seat cushion 41, as shown in FIG. 10 and FIG. 11.

The inner and outer casters 94, 95 (i.e., their caster bodies 98, 104), which are oriented downward below the front portion 41b, abut (or rest) on a guide plate 121 of the floor 11 (see FIG. 10).

By abutting on the guide plate 121, the caster bodies 98, 104 can support the first seat 16 in the upright position. This is advantageous in that the left headrest 43 does not need to be brought into abutment on the floor 11 to support the first seat 16. Therefore, it is possible to prevent the left headrest 43 from being soiled, and the external appearance can be improved.

Additionally, supporting the first seat 16 by the caster bodies 98, 104 is advantageous because a load applied to the fixed rail 35 via the left leg mechanism 25 is small. Since the first seat 16 supported by the caster bodies 98, 104 is located away from the fixed rail 35, the inner and outer vertical leg sections 51, 52 of the left leg mechanism 25 may have any length (e.g., a large length), and the degree of freedom of design is improved.

As described above, the caster bodies 98, 104 are disposed in parallel to the lateral direction of the vehicle (along the guide plate 121). Therefore, the caster bodies 98, 104 can roll on the guide plate 121 as the first seat 16 moves in the lateral direction of the vehicle.

The rolling of the caster bodies 98, 104 allows the left seat cushion 41 in the upright position to move smoothly along the fixed rail 35 in the lateral direction of the vehicle. The guide plate 121 is a plate-shaped member disposed on the vehicle body floor 11 for guiding the caster bodies 98, 104.

As shown in FIG. 3, and FIG. 13 to FIG. 16, the left locking/unlocking system 27 includes a left locking mechanism 131 for locking the left slider 48 at a predetermined location of the fixed rail 35, a left operation member 132 for unlocking the left locking mechanism 131, and a left prevention member 133 for preventing the left operation member 132 from unlocking the left locking mechanism 131 as the first seat is in the seating position as well as for preventing the first seat from moving to the seating position as the left locking mechanism is in an unlocked position.

The left locking mechanism 131 locks the left slider 48 in a predetermined location of the fixed rail 35. When in the unlocked position, the left locking mechanism 131 allows the left slider 48 to move along the fixed rail 35 with the first seat 16 in the upright position (FIG. 11).

By pulling the left locking mechanism 131 upward, the left operation member 132 moves the left locking mechanism 131 from a locked position to the unlocked position.

The left prevention member 133 prevents the left operation member 132 from unlocking the left locking mechanism when the first seat 16 is in the seating position (FIG. 8A). Furthermore, the left prevention member 133 prevents the left seat cushion 41 from moving to the seating position as the first seat 16 is in the stowed position (FIG. 11) and the left locking mechanism 131 is in the unlocked position.

The right leg mechanism 31, the right support mechanism 32, and the right locking/unlocking system 33 of the seat assembly 15 are disposed in symmetry with the above-described left leg mechanism 25, the left support mechanism 26, and the left locking/unlocking system 27. Therefore, descriptions of the mechanism 31, 32 and the system 33 are omitted.

Figure 12:
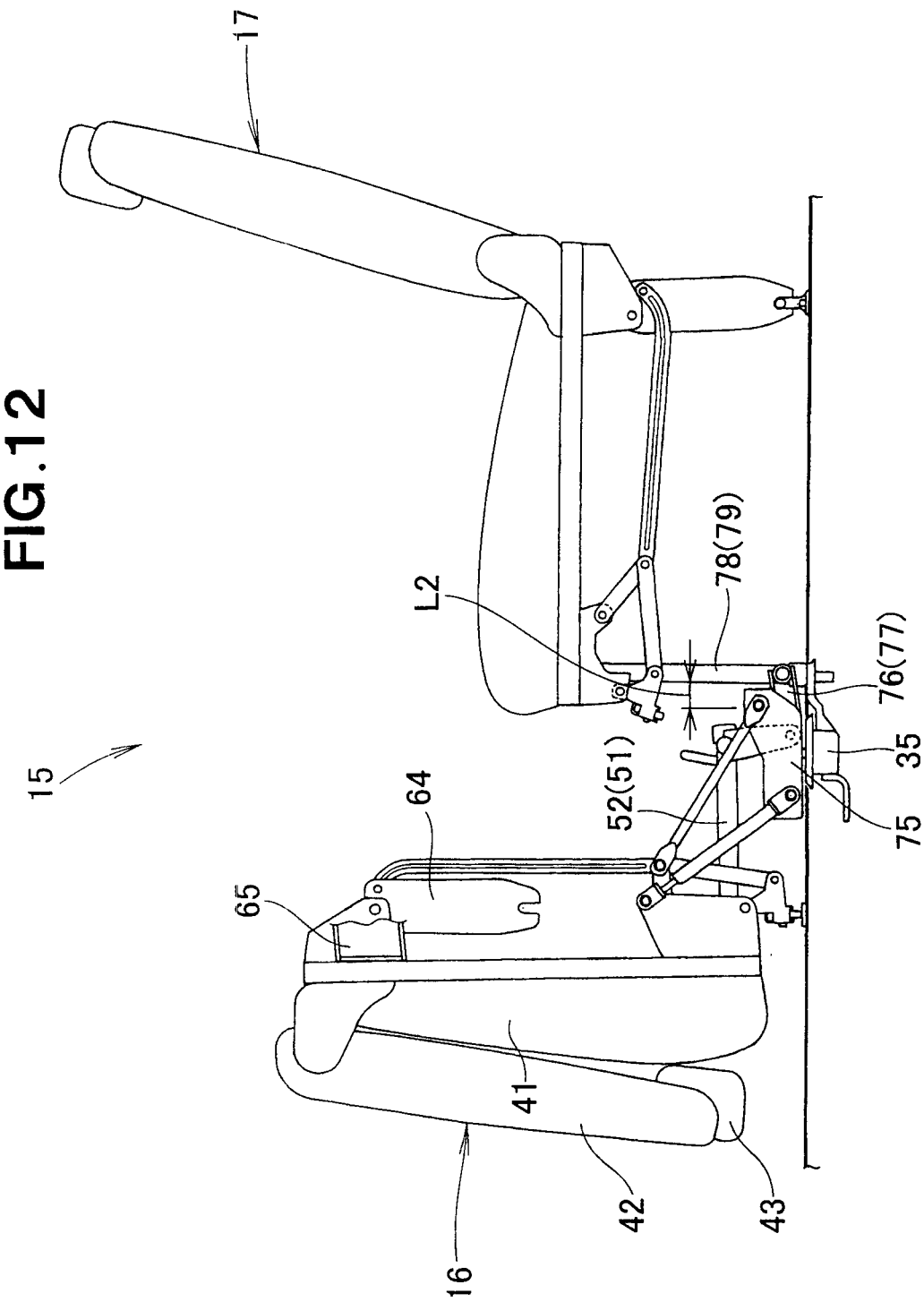
FIG. 12 is a side view of the seat assembly with the first seat in the upright position being located forward of the second seat.

As shown in FIG. 8A and FIG. 12, the inner and outer vertical leg sections 51, 52 are rearward offset a distance L2 from the left slider 48.

Inner and outer horizontal sections (second horizontal section) 76, 77 of the right leg mechanism 31 extend substantially horizontally and forward from inner and outer vertical leg sections (second vertical leg section) 78, 79 of the right leg mechanism 31 toward the right slider 86 (FIG. 3). The inner and outer vertical leg sections 78, 79 are rearward offset a distance L2 from the right slider 86.

Description will be made as to movement of the first seat 16 in the stowed position along the fixed rail 35 to a point forward of the second seat 17 in the seating position, as shown in FIG. 12.

Since the inner and outer vertical leg sections 78, 79 are rearward spaced a distance L2 from the right slider 86, the left slider 48 (FIG. 3) and the outer support bracket 75 do not interfere with the inner and outer vertical leg sections 78, 79 during movement of the first seat 16.

Since the left slider 48 does not interfere with the inner and outer vertical leg sections 78, 79, the degree of freedom of determining the shape of the inner and outer vertical leg sections 78, 79 can be enhanced. For example, the inner and outer vertical leg sections 78, 79 may extend vertically downward from the second seat 17 to better support and the weight of the second seat 17 and the weight of a person sitting on the seat 17. Since the inner and outer vertical leg sections 78, 79 are rearward offset a distance L2 from the right slider 86, the shape of the inner and outer vertical leg sections 78, 79 can be determined so as to better support the weight of the second seat 17 and the weight of the person sitting on the seat 17.

On the other hand, the second seat 17 is moved by the right movement mechanism 85 (FIG. 3) to the stowed position and then moves along the fixed rail 35 to a point forward of the first seat 16, during which the right slider 86 does not interfere with the inner and outer vertical leg sections 51, 52 of the left leg mechanism 25.

Prevention of the right slider 86 from interference with the inner and outer vertical leg sections 51, 52 makes it possible to enhance the degree of freedom to determine the shape of the inner and outer vertical leg sections 51, 52. For example, the inner and outer vertical leg sections 51, 52 may extend vertically downward from the first seat 16 to support the weight of the second seat 16 and the weight of a person sitting on the seat 16. Since the inner and outer vertical leg sections 51, 52 are rearward offset a distance L2 from the left slider 48, the shape of the left inner and outer vertical leg sections 51, 52 can be determined so as to better support the weight of the second seat 16 and the weight of the person sitting on the seat 16.

As shown in FIG. 13 to FIG. 16, the left locking mechanism 131 includes a locking member 141 vertically movably supported by the left slider 48 (slider body 81), pressing means 142 for pressing the left locking member 141 downward, the two first locking holes 143 for locking engagement with the locking member 141, and the two second locking holes 144 (FIG. 4) for locking engagement with the locking member 141.

The two first locking holes 143 (FIG. 16) are spaced at a pitch Pi1 and each of the holes 143 has a width W1.

The two second locking holes 144 (FIG. 4) are spaced at a pitch Pi1 and each of the holes 144 has a width W1, as in the first locking holes 143.

The slider body 81 includes a fitting portion 146 at a lateral center thereof, and the fitting portion 146 defines a fitting hole 147 through which the locking member 141 is vertically movably inserted.

The locking member 141 has a body portion 151 vertically movably inserted through the fitting hole 147, a base portion 152 contiguous with a lower end of the body portion 151, and two locking lugs 153 protruding from a lower end of the base portion 152.

The body portion 151, which is inserted through the fitting hole 147, is vertically movably supported by the fitting portion 146.

The base portion 152 defines an opening 155 engaged with a pressing member 156 of the pressing means 142.

Figure 16:
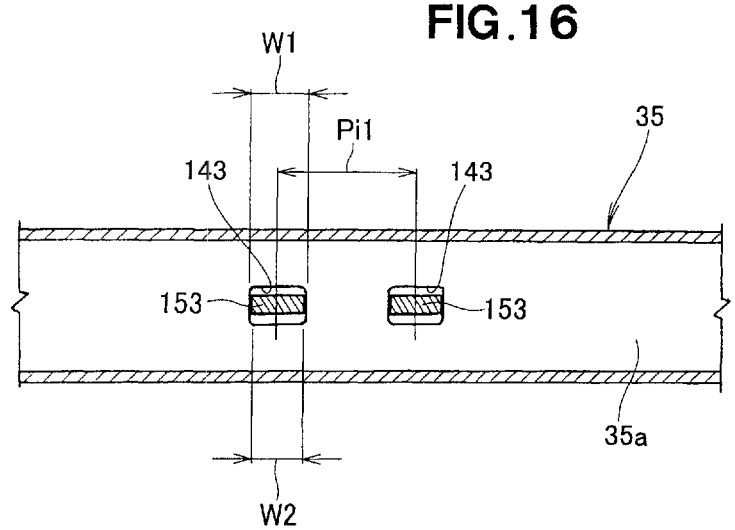
FIG. 16 is an enlarged cross-sectional view taken along line 16-16 of FIG. 15.

The two locking lugs 153 are spaced at a pitch Pi1 and each of the lugs 153 has a width W2 (FIG. 16). The width W2 is smaller than the width W1 (W2<W1).

The two locking lugs 153 are configured to be fitted into the two first locking holes 143, respectively as well as into the two second locking holes 144, respectively (FIG. 4).

The pressing means 142 includes the pressing member 156 rotatably connected to the slider body 81 via a support pin 157, and a spring member 158 for urging the pressing member 156 in a counterclockwise direction.

The end portion of the pressing member 156 is engaged with the opening 155 and urged by the spring member 158 in the counterclockwise direction to press the locking member 141 downward.

Since the locking member 141 is pressed downward, the two locking lugs 153 are held in fitting engagement with the two first locking holes 143, respectively, (the left locking mechanism 131 is held in the locked position).

The two first locking holes 143 are formed on the bottom portion 35a of the fixed rail 35 for locking the left slider 48 at a left predetermined location P3 (see FIG. 4) of the bottom portion 35a of the fixed rail 35 (with the seat 16 in the seating position).

When the locking member 141 is lifted up against an urging force of the left spring member 158, the two locking lugs 153 comes out of the two first locking holes 143 (the left locking mechanism 131 is moved to the unlocked position).

The two second locking holes 144 shown in FIG. 4 are formed on the bottom portion 35a of the fixed rail 35 for locking the left slider 48 at a predetermined location P4 (see FIG. 31) with the seat 16 in the stowed position.

In other words, when in the locked position, the left locking mechanism 131 locks the left slider 48 at the predetermined location P3 or P4 on the fixed rail 35.

When the left slider 48 is locked at the location P3, the first seat 16 is locked in the seating position shown in FIG. 4 (service position).

When the left slider 48 is locked at the location P4, the first seat 16 is locked in the stowed position shown in FIG. 6 (within the right foot space 19).

Figure 27:
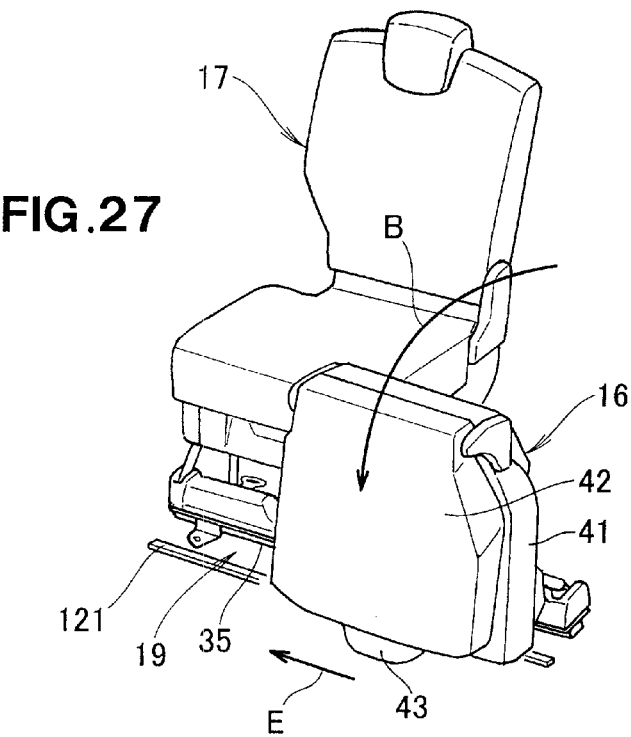
FIG. 27 is a perspective view of the first seat as the first seat moves to a stowed position.

The left locking mechanism 131 allows the left slider 48 to move along the fixed rail 35 when the mechanism 131 is in the unlocked position and the seat 16 is in the stowed position (FIG. 27).

The left operation member 132 includes an operation strap 161 having a proximal end 161a connected to the body portion 151, a grip 162 connected to a distal end 161b of the operation strap 161, and a stopper pin 163 extending through the proximal end 161a of the strap 161 and the body portion 151 of the locking member 141.

The operation strap 161 is a flexible member extending through the left prevention member 133. The grip 162 is configured to be gripped by a user's hand.

The stopper pin 163 abuts on the left prevention member 133, when the user pulls up the locking member 141 gripping the grip 162, so as to limit a level at which the locking member 141 is pulled up.

The stopper pin 163 serves as a member fastening the proximal end 161a of the operation strap 161 to the body portion 151.

In other words, the left operation member 132 is operated by the user holding the grip 162 to pull the locking member 141 upward (in a predetermined direction) for unlocking the left locking mechanism 131, that is, moving the left locking mechanism 131 from the locked position to the unlocked position.

The left prevention member 133 is disposed on a portion 53a of the horizontal leg section 53 in a vicinity of the outer vertical leg section 52 (on a side of the seat cushion), and is formed to allow the operation strap 161 to pass therethrough.

As shown in FIG. 14, the left prevention member 133 is formed by a bent wire having a pair of joint portions 133a and an insertion portion 133b. The pair of joint portions 133a is disposed on the portion 53a of the horizontal leg section 53 in the vicinity of the outer vertical leg section 52, and the insertion portion 133b and the horizontal leg section 53 define a closed space 165 through which the operation strap 161 can be inserted.

Figure 17:
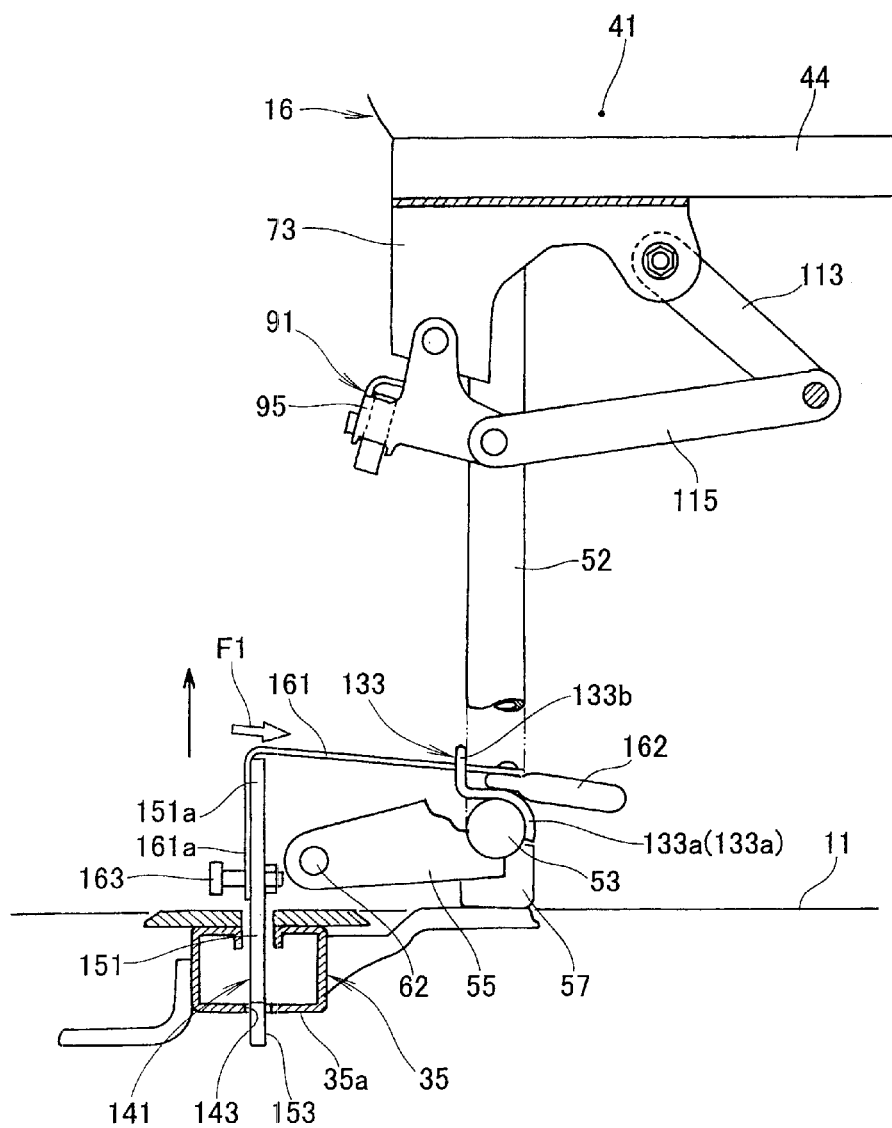
FIG. 17 is an enlarged cross-sectional view taken along line 17-17 of FIG. 15.

As shown in FIG. 13 and FIG. 17, the horizontal leg section 53 is located rearward of the locking member 141 when the first seat 16 is in the seating position. Since the left prevention member 133 is disposed on the horizontal leg section 53, the insertion portion 133b of the left prevention member 133 is also located rearward of the locking member 141.

The insertion section 133b is located at substantially the same level as an upper end 151a of the body portion 151 of the locking member 141.

Therefore, the operation strap 161 extends substantially horizontally from the upper end 151a of the body portion 151 along an upper portion 48c (FIG. 13) of the left slider 48 toward the insertion portion 133b.

In other words, the left prevention member 133 is located such that the operation strap 161 is bent into an orientation substantially orthogonal to the locking member 141 (to a direction of an arrow in FIG. 17, i.e., an upward direction in which the locking member 141 is movable), as viewed in side elevation.

When the user grips the grip 162 and pulls the operation strap 161, a tensile force F1 directed perpendicularly to the locking member 141, as indicated by an arrow, acts on the locking member 141. However, the tensile force F1 does not act on the locking member 141 in such a direction as to lift up the locking member 141. Therefore, it is possible to prevent the locking member 141 from being lifted up when the user pulls the operation strap 161.

Since the locking member 141 is not lifted out of the first locking holes 143 with the first seat 16 in the seating position, it is possible to prevent the first seat 16 from moving in the lateral direction of the vehicle, and convenience of use can be improved.

When the first seat 16 is in the seating position, the left prevention member 133 is disposed to bend the flexible operation strap 161 into orientation substantially orthogonal to the upward direction (the direction of the arrow) in which the locking member 141 is movable. Since mere disposition of the left prevention member 133 to bend the operation strap 161 prevents the operation strap 161 and thus the locking member 141 from being pulled up, the left prevention member 133 is simple in structure.

Figure 18:
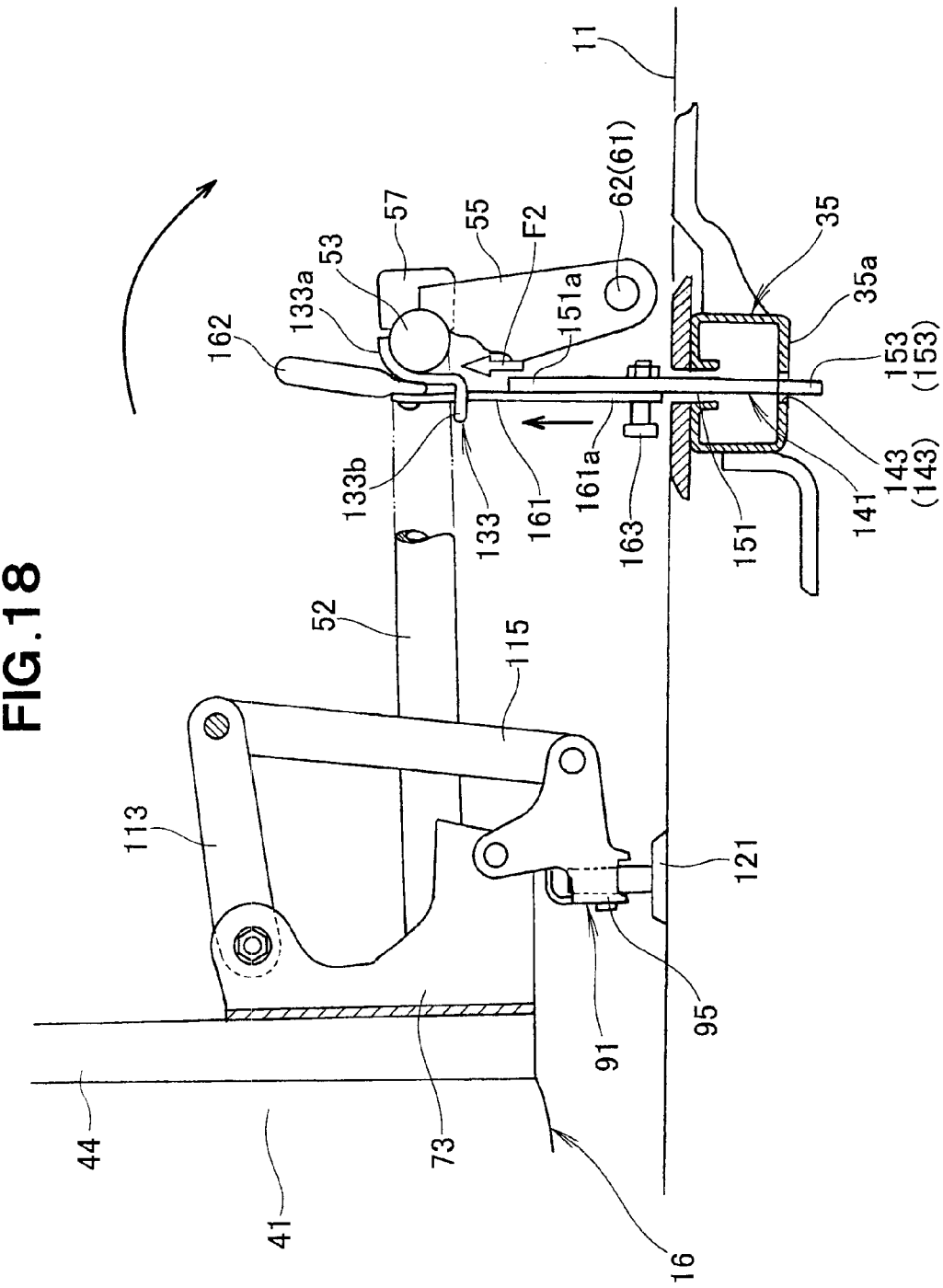
FIG. 18 is a view showing that the first seat of FIG. 17 is in the upright position.

As shown in FIG. 18, when the first seat 16 is in the stowed position, the horizontal leg section 53 is located above the locking member 141. Since the left prevention member 133 is disposed on the horizontal leg section 53, the insertion portion 133b of the left prevention member 133 is located above the locking member 141.

In this state, the operation strap 161 extends substantially vertically from the upper end 151a of the body portion 151 of the locking member 141 toward the insertion portion 133b.

In other words, the operation strap 161 is disposed in substantially parallel to the locking member 141 (the upward direction in which the locking member 141 is movable (the direction of the arrow)).

When the user grips the grip 162 and pulls the operation strap 161 upward, a tensile force F2 directed in the upward direction in which the locking member 141 is movable, as indicated by the arrow, acts on the locking member 141. The locking member 141 is thus lifted up by the tensile force F2 against the urging force of the spring member 158 (FIG. 13). The upward lifting of the locking member 141 brings the locking lugs 153 out of the first locking holes 143 to thereby move the left locking mechanism 131 to the unlocked position.

The left prevention member 133 allows the operation member 132 (FIG. 13) to unlock the left locking mechanism 131 when the first seat 16 is in the stowed position.

With the locking lugs 153 out of the first locking holes 143, the first seat 16 in the stowed position is slidable along the fixed rail 35.

Figure 19:
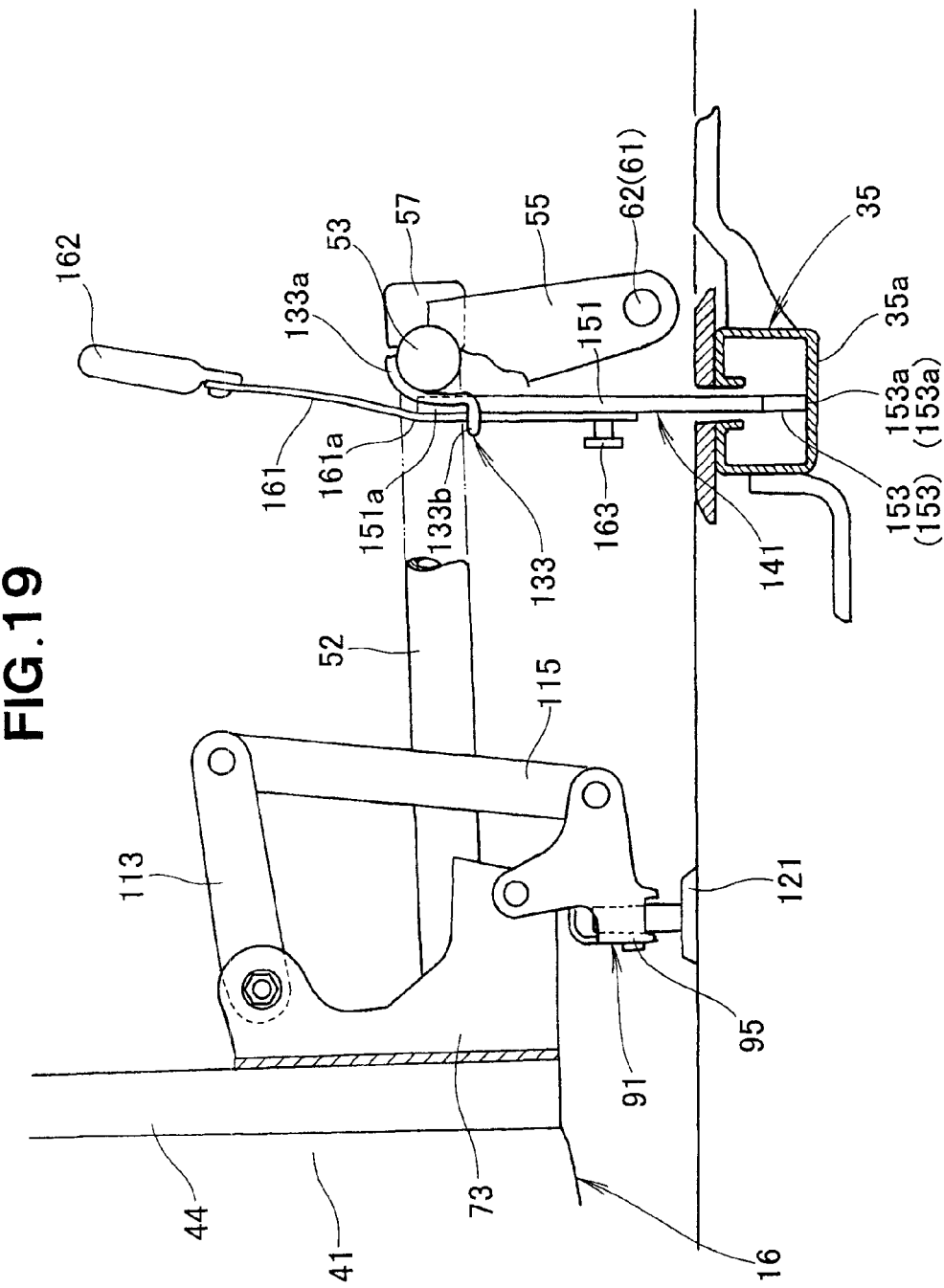
FIG. 19 is a view showing the left locking mechanism shown in FIG. 18 is in an unlocked position.
Figure 20:
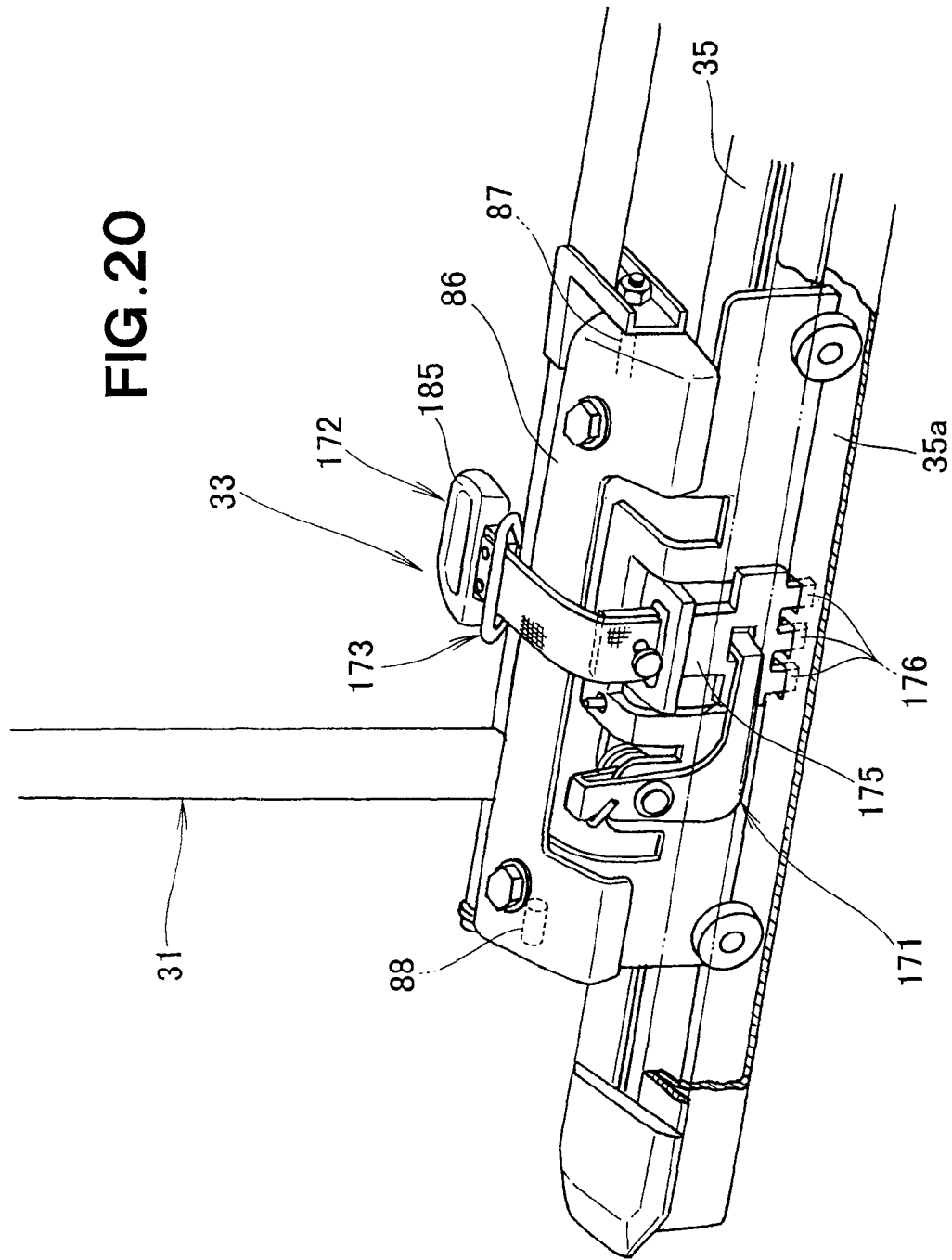
FIG. 20 is a perspective view showing a right locking mechanism of the seat assembly.
Figure 21:
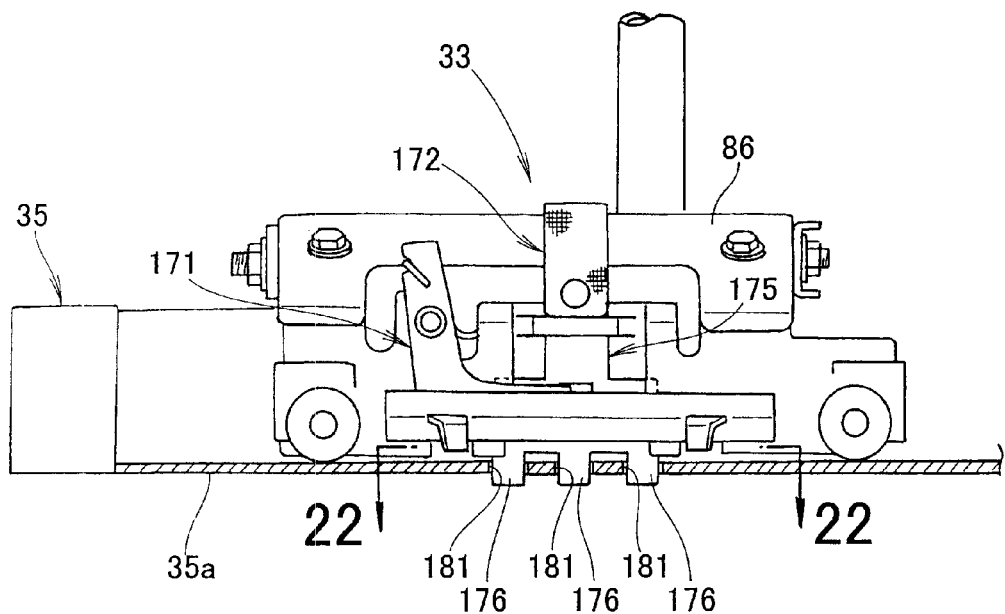
FIG. 21 is a front side view of the right locking mechanism shown in the FIG. 20.
Figure 22:
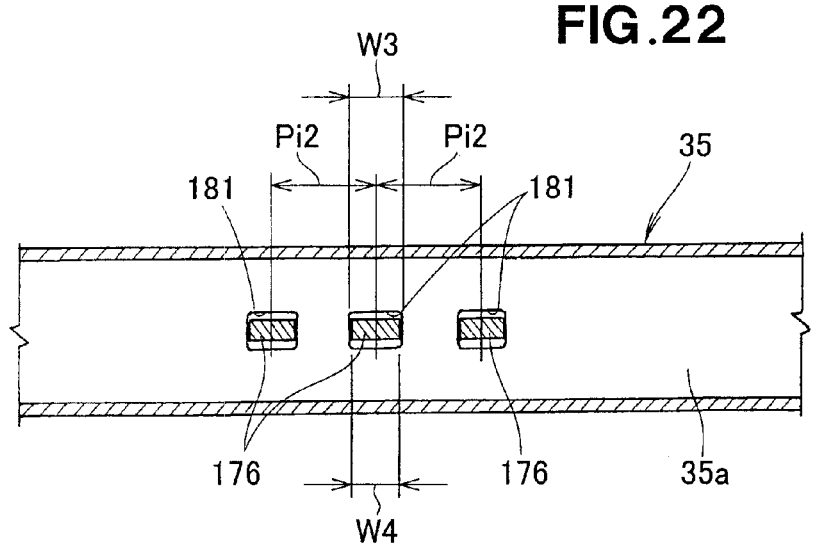
FIG. 22 is an enlarged cross-sectional view taken along line 22-22 of FIG. 21.

As shown in FIG. 19, the two locking lugs 153 are kept out of the two first locking holes 143 (FIG. 18) (the left locking mechanism 131 is held in the unlocked position) as the first seat 16 in the stowed position moves along the fixed rail 35.

In this case, it is undesirable that the first seat 16 move from the stowed position to the seating position as the first seat 16 is sliding along the fixed rail 35.

In this regard, the body portion 151 (upper end 151a) of the locking member 141 is held to the insertion portion 133b of the left prevention member 133 (or the upper end 151a is held within the closed space 165; FIG. 14) when the first seat 16 is in the stowed position and the left locking mechanism 131 is in the unlocked position.

More specifically, the two locking lugs 153 are pressed downward by the urging force of the spring member 158 (FIG. 13) with the left lock mechanism 131 in the unlocked position. Therefore, bottom portions 153a of the locking lugs 153 are held in abutment on the bottom portion 35a of the fixed rail 35.

In this state, the upper end 151a of the body portion 151 of the locking member 141 is held in fitting engagement with the closed space 165 (FIG. 14). Since the upper end 151a of the body portion 151 is fitted in the closed space 165, the upper end 151a is held to the insertion section 133b via the operation strap 161.

As shown in FIG. 18, only the flexible operation strap 161 is inserted through the insertion portion 133b of the left prevention member 133 when the first seat 16 is in the seating position and the left locking mechanism 131 is in the locked position. Therefore, when the first seat 16 moves from the stowed position to the seating orientation, i.e., the outer vertical leg section 52 and the horizontal leg section 53 (i.e., the insertion portion 133b) turns in the direction of an arrow (clockwise direction) on the inner and outer pivots 61, 62.

As shown in FIG. 19, on the other hand, the upper end 151a of the body portion 151 of the locking member 141 is held to the insertion portion 133b via the operation strap 161 when the first seat 16 is in the stowed position and the left locking mechanism 131 is in the unlocked position.

The body portion 151 (of the locking member 141) is supported in vertical orientation by the fitting section 146 (FIG. 13) of the slider body 81 of the left slider 48. The upper end 151a of the body portion 151 prevents the insertion portion 133b from turning in the clockwise direction on the inner and outer pivots 61, 62.

In other words, the left prevention member 133 prevents the left seat cushion 41 from moving to the seating position when the first seat 16 is in the stowed position and the left locking mechanism 131 is in the unlocked position. Therefore, the first seat 16 can be prevented from returning to the seating position when the first seat 16 is in any location other than a predetermined location where the first seat cushion is returnable to the seating position (e.g., while the first seat 16 is sliding). Namely, the first seat 16 can be returned to the seating position only in the predetermined location where the first seat cushion is returnable to the seating position, and convenience of use can be improved.

Additionally, when the left locking mechanism 131 is in the unlocked position, the left prevention member 133 interferes with the left locking mechanism 131 (i.e., the upper end 151a of the body portion 151 of the locking member 141 of the left locking mechanism 131) to prevent the movement of the first seat 16 to the seating position.

Since mere interference of the left prevention member 133 with the upper end 151a of the body portion 151 prevents the movement of the first seat 16 to the seating position, the left prevention member 133 is simple in structure.

The right leg mechanism 31 and the right support mechanism 32 are in a symmetrical relation to the above-described left leg mechanism 25 and left support mechanism 26, and therefore, a description of the mechanisms 31, 32 is omitted.

As shown in FIG. 4, and FIG. 20 to FIG. 22, the right locking/unlocking system 33 includes a right locking mechanism 171 for locking the right slider 86 in a predetermined location on the fixed rail 35, a right operation member 172 for unlocking the right locking mechanism 171, and a right prevention member 173 for preventing the right operation member 173 from unlocking the right locking mechanism 171 when the seat 17 is in the seating position sitting as well as for preventing movement of the seat 17 to the seating position when the right locking mechanism 171 is in an unlocked position.

The operation member 172 and the right prevention member 173 are in a symmetrical relation to the above-described left operation member 132 and left prevention member 133, and therefore, a description of the members 172, 173 is omitted.

The right locking mechanism 171 includes the locking member 175 having three locking lugs 176, and the three first locking holes 181 and the three second locking holes 182 formed in the bottom portion 35a of the fixed rail 35. Other elements of the right locking mechanism 171 are symmetrical to the left lock mechanism 131.

The three first locking holes 181 are spaced at a pitch Pi2 and each of the holes 181 has a width W3.

The three second locking holes 182 are spaced at a pitch Pi2 and each of the holes 182 has a width W3, as in the three first locking holes 181.

The three locking lugs 176 are spaced at a pitch Pi2 and each of the lugs 176 has a width W4. The width W4 is smaller than the width W3 (W4<W3). The three locking lugs 176 are configured to be inserted into the three first right latch holes 181 as well as into the three second locking holes 182, respectively (FIG. 3).

The three first locking holes 181 are formed on locations of the bottom portion 35a of the fixed rail 35 for locking the right slider 86 at a right predetermined location P5 (see FIG. 4) with the seat 17 in the seating position.

The three second locking holes 182 are formed in locations of the bottom portion 35a of the fixed rail 35 for locking the right slider 86 at a predetermined location P6 (see FIG. 35(b)) with the seat 17 in the stowed position.

The right locking mechanism 171 locks the right slider 86 at the predetermined location P5 or P6 of the fixed rail 35 when the right locking mechanism 171 is in a locked state.

When the right slider 86 is located at the location P5, the second seat 17 is located in the seating position (service position) shown in FIG. 4.

When the right slider 86 is locked at the location P6, the second seat 17 is locked in the stowed position (the left foot space 18; see FIG. 35(b)).

As shown in FIG. 4, FIG. 15, FIG. 21, and FIG. 22, the pitch Pi2 of the first and second locking holes 181, 182 is smaller than the pitch Pi1 of the first and second locking holes 143, 144 (pitch Pi2<pitch Pi1).

The width W3 of the first and second locking holes 181, 182 is smaller than the width W1 of the first and second locking holes 143, 144 (width W3<width W1).

As described above, the sizes of the left locking mechanism 131 (the locking lugs 153, and the first and second locking holes 143, 144) and the right locking mechanism 171 (the locking lugs 176, and the first and second locking holes 181, 182) are different from each other, i.e., the widths W1 to W4 and pitches Pi1 and Pi2 are different from each other. This makes it possible to prevent locking engagement between of the left locking lugs 153 of the left locking mechanism 131 and the first and second locking holes 181, 182 of the right locking mechanism 171. As a result, the left slider 48 can smoothly move to a predetermined location without stopping on the way to such a predetermined location. When the left slider 48 moves to the predetermined location, the left slider 48 is reliably locked by the left locking mechanism 131 (through locking engagement between the locking lugs with the first or second locking holes 143, 144). As a result, the second seat 16 can smoothly move in the lateral direction of the vehicle width direction (e.g., to a point forward of the seat 17).

Similarly, there is no risk of the right slider 86 being locked by the left locking mechanism 131 (through locking engagement between the locking lugs and the first or second locking holes 143, 144). As a result, the second seat 17 can smoothly move in the lateral direction of the vehicle (e.g., to a point forward of the seat 16), as in the first seat 16.

Next, description is made with reference to FIG. 23 to FIG. 32 as to pivoting of the first seat 16 into the stowed position (upright position) for movement to the right foot space 19.

Figure 23:
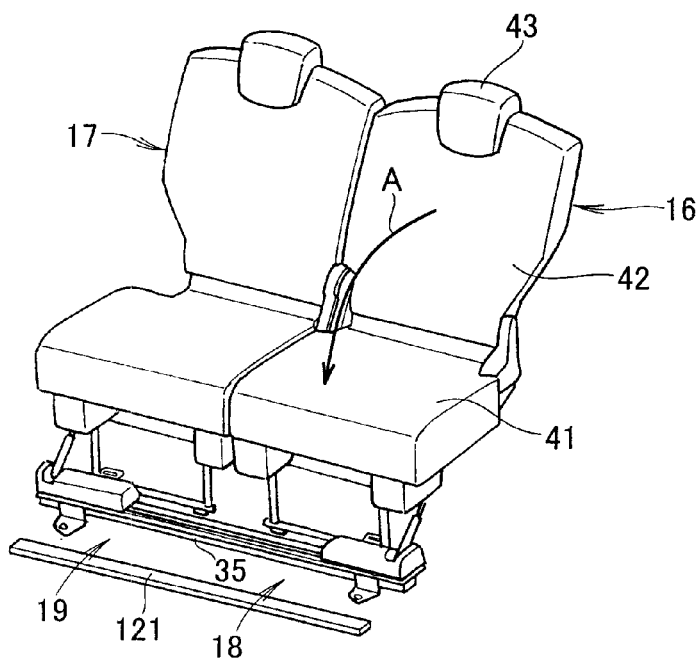
FIG. 23 is a perspective view of the seat assembly, showing that a seatback of the first seat is in an upright position.

As shown in FIG. 23, the left seat back 42 of the first seat 16 is tilted down, as indicated by an arrow A, onto the left seat cushion 41.

Figure 24:
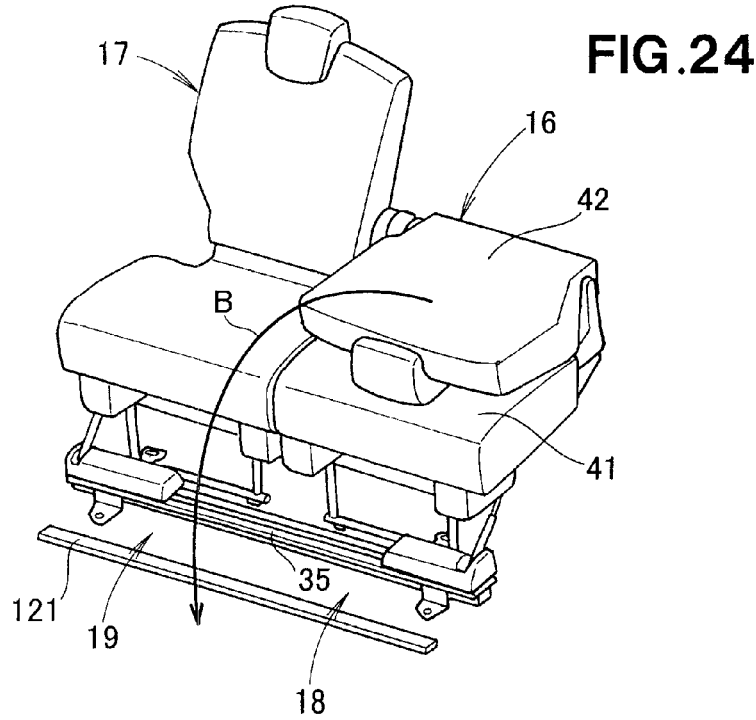
FIG. 24 is a perspective view of the seat assembly, showing that the seatback of the first seat is folded onto a first seat cushion.

As shown in FIG. 24, the left seat back 42 is folded down onto the left seat cushion 41. The first seat 16 with the left seat back 42 lying on the seat cushion 41 pivots (moves in tumbling fashion) on the inner and outer pivots 61, 62 (FIG. 13) (toward the left foot space 18), as indicated by an arrow B.

Figure 25:
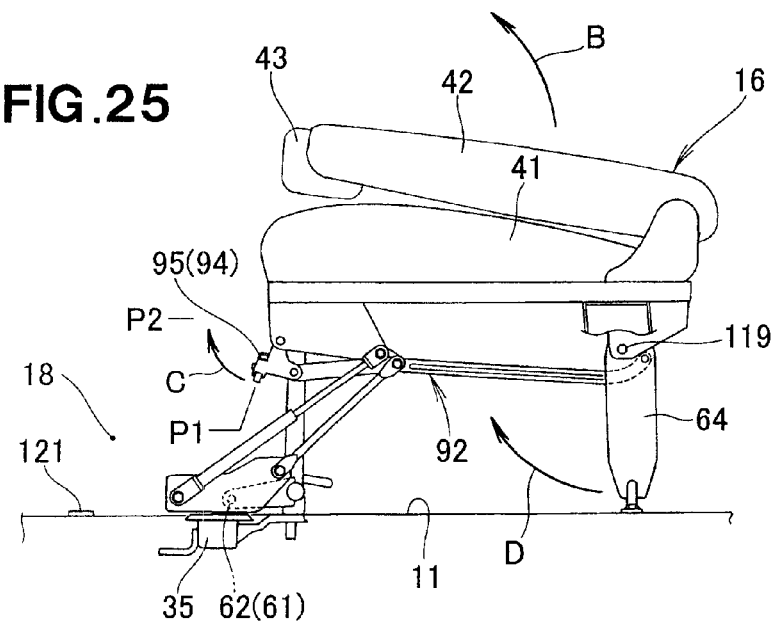
FIG. 25 is a side view of the first seat shown in FIG. 24.

The pivoting of the first seat 16 in the manner indicated by the arrow B causes the left link mechanism 92 to turn the left inner and outer casters 94, 95, as indicated by an arrow C, from the retracted position P1 to the support position P2, as shown in FIG. 25.

During the pivoting of the first seat 16, the inner rear leg 64 is swung forward about the left leg support shaft 119 by the left link mechanism 92, as indicated by an arrow D.

Figure 26:
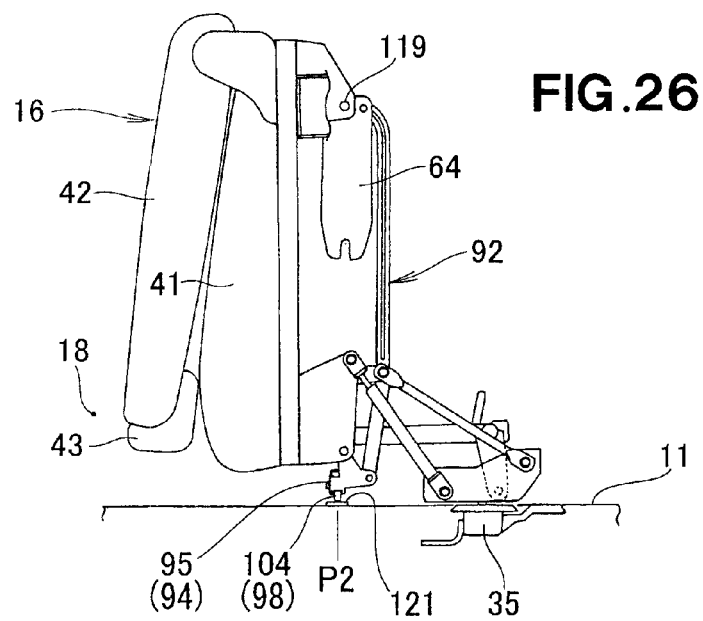
FIG. 26 is a side view of the first seat shown in FIG. 24 as the first seat pivots upward to the upright position.

As shown in FIG. 26 and FIG. 27, the first seat 16 with the seat back 42 lying on the seat cushion pivots (moves in tumbling fashion) into the stowed position (upright position) within the left foot space 18. In this state, the inner and outer casters 94, 95 are held in the support position P2. Therefore, the caster bodies 98, 104 of the inner and outer casters 94, 95 abut on the guide plate 121 of the floor 11, such that the first seat 16 is supported in the upright position.

Figure 28A:
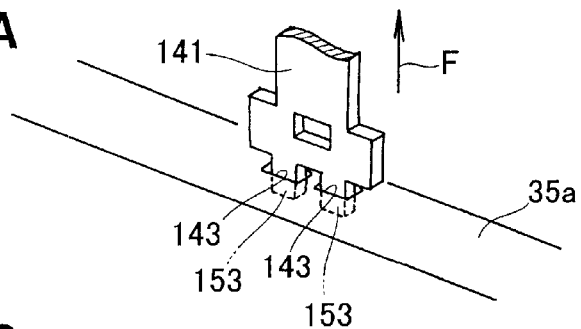
FIG. 28A is a view showing that a left locking member has been fitted into first left locking holes.

As shown in FIG. 28A, the locking member 141 is pulled up by a user, as indicated by an arrow F, with the grip 162 (FIG. 18) held by his hand. The upward pulling of the locking member 141 brings the locking lugs 153, 153 out of the first locking holes 143, 143.

In this state, the first seat 16 shown in FIG. 27 moves along the fixed rail 35 toward the right foot space 19, as indicated by an arrow E.

During the movement of the first seat 16 along the fixed rail 35, the inner and outer caster bodies 98, 104 roll on the guide plate 121 to smoothly move the left seat cushion 41 in the upright position in the lateral direction of the vehicle (the direction of the arrow E; FIG. 27).

Figure 28B:
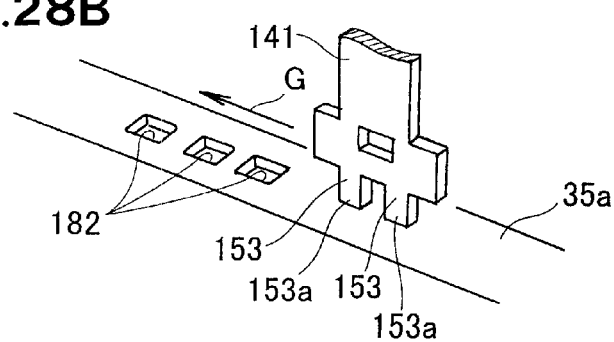
FIG. 28B is a view showing that the left locking member moves toward second right locking holes.

As shown in FIG. 28B, the lower ends 153a, 153a of the locking lugs 153, 153 of the locking member 141 move along the bottom portion 35a of the fixed rail 35, as indicated by an arrow G, during the movement of the first seat 16 (FIG. 27).

After moving as indicated by the arrow G, the locking lugs 153, 153 arrive at the second locking holes 182.

Figure 29:
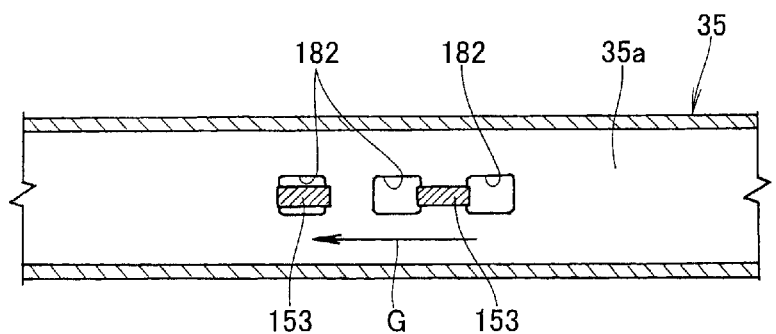
FIG. 29 is a view showing that left locking lugs pass over the second right locking holes when the first seat is to be locked in the stowed position.

As shown in FIG. 29, the locking lugs 153, 153 and the second locking holes 182 are configured not to be in locking engagement with each other. It is therefore possible for the locking lugs 153, 153 to smoothly move without stopping in locking engagement with the second locking holes 182.

Figure 30:
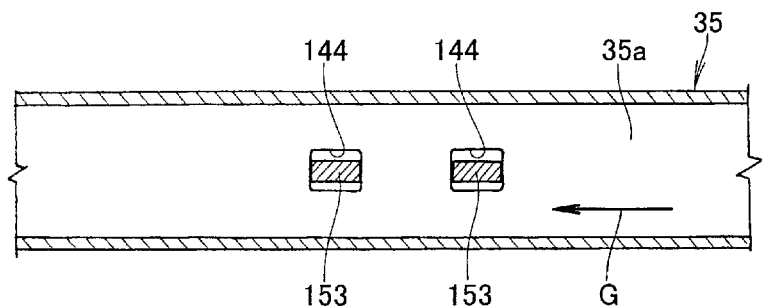
FIG. 30 is a view showing that the left locking lugs are fitted into the second left locking holes.

As shown in FIG. 30, the locking lugs 153, 153 arrive at the second locking holes 144, 144 after moving as indicated by the arrow G. As a result, the locking lugs 153, 153 fit into the second locking holes 144, 144 for locking engagement therewith.

Figure 31:
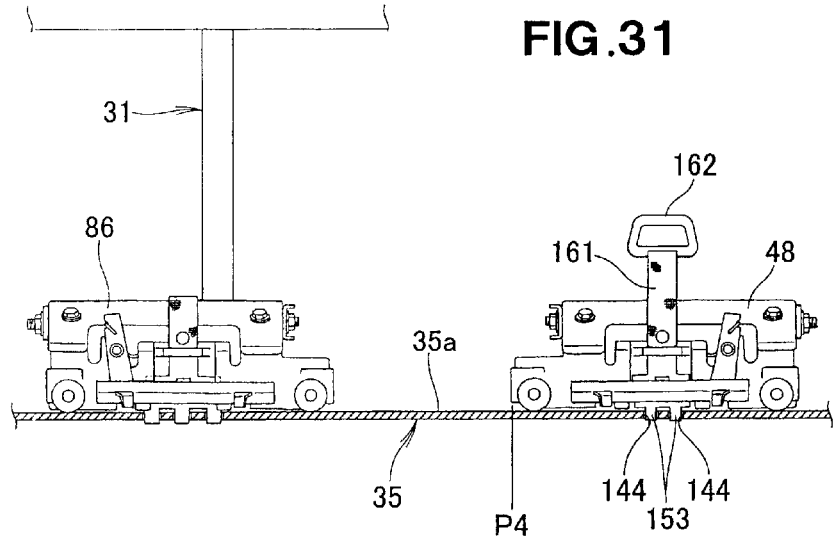
FIG. 31 is a view showing how the first seat is locked in the stowed position.

The locking engagement of the locking lugs 153, 153 with the second locking holes 144, 144 locks the left slider 48 at the location P4, as shown in FIG. 31.

Figure 32:
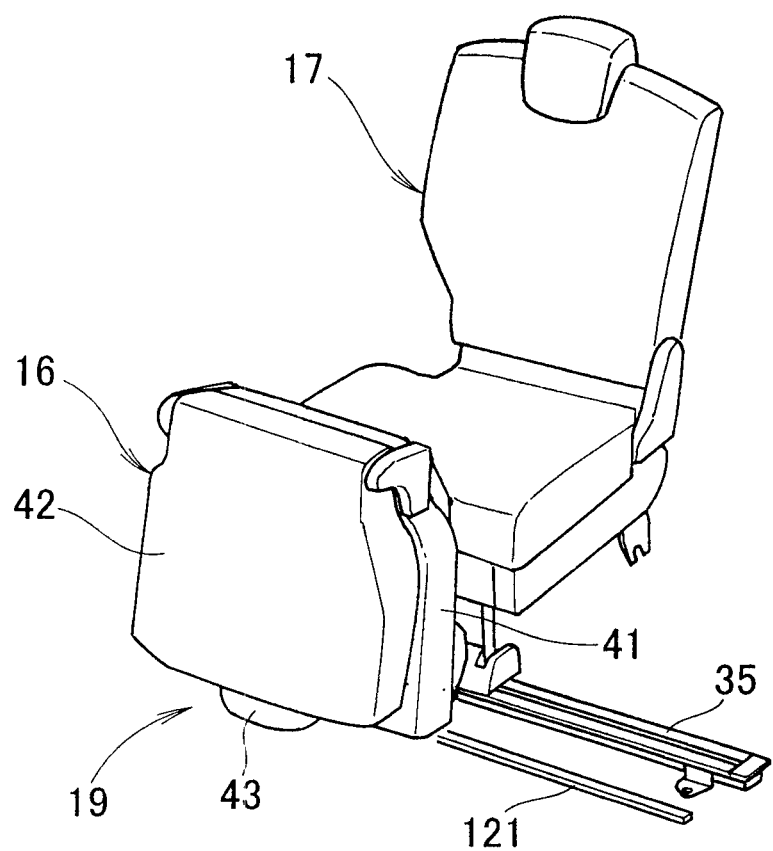
FIG. 32 is a perspective view of the first seat locked in the stowed position.

With the left slider 48 (FIG. 31) locked at the location P4, the first seat 16 which has pivoted upward into the stowed position is held within the right foot space 19, as shown in FIG. 32.

The left slider 48 of the left leg mechanism 25 is disposed laterally outwardly relative to the first seat 16, and the right slider 86 of the right leg mechanism 31 is disposed laterally outwardly relative to the second seat 17, as discussed in relation to FIG. 3 and FIG. 4.

With the first seat 16 held within the right foot space 19, thus, the left slider 48 and the right slider 86 are both disposed forward of the second seat 17 such that the left slider 48 and the right slider 86 can be prevented from interference (see FIG. 31).

Figure 33:
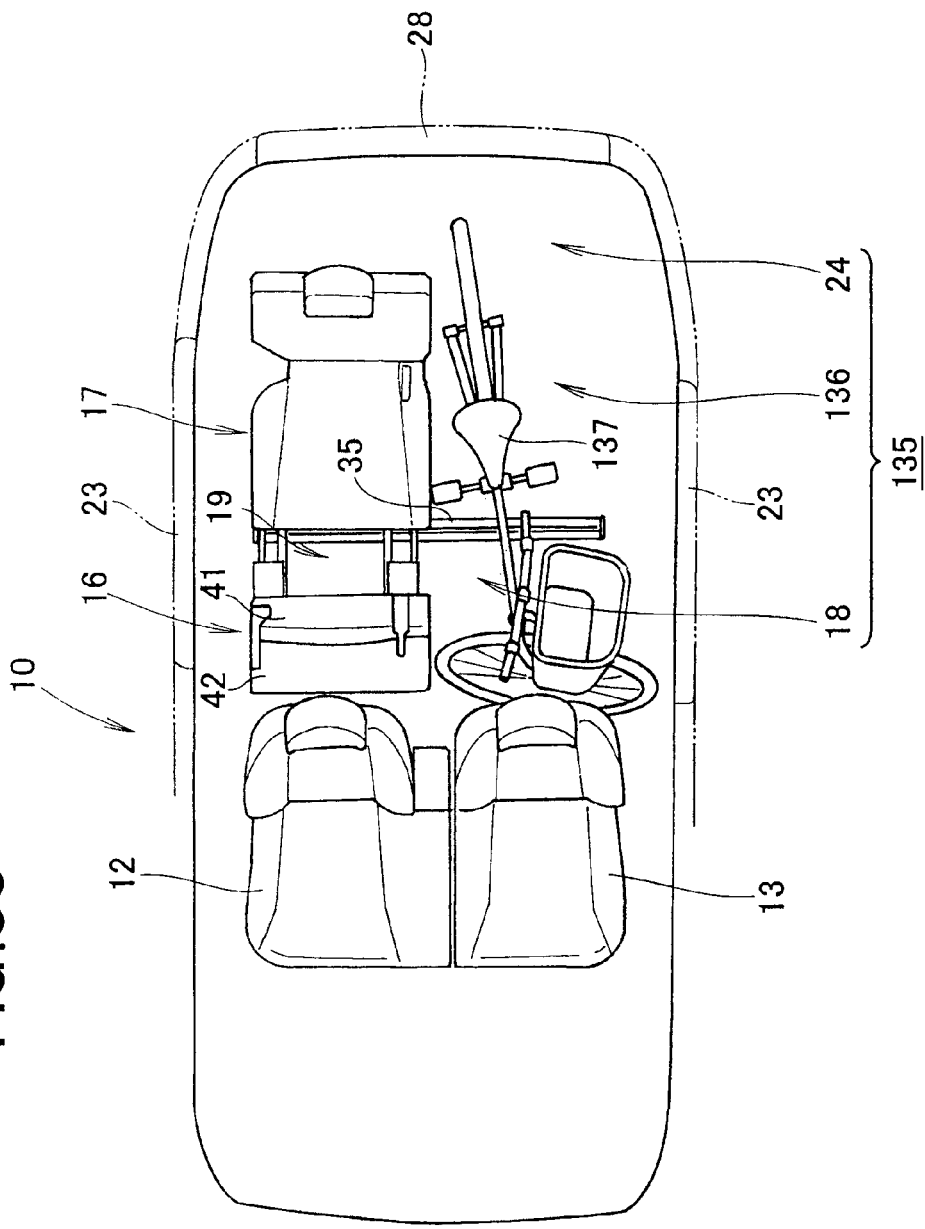
FIG. 33 is a plan view of a vehicle, showing that the first seat is in the stowed position and a bicycle is disposed within a luggage space defined laterally of the first and second seats.

As shown in FIG. 33, the left foot space 18 and a space 136 sized to accommodate the first seat 16 in the seating position are made open by movement of the first seat 16 into the right foot space 19. Therefore, the space 136, the left foot space 18, and the luggage compartment 24 define a large space 135 such that a bicycle 137 or other large luggage is loaded into the space 135 through openings provided by the sliding doors 23 or the tailgate 28 opened.

Description is made with reference to FIG. 34 and FIG. 35 as to movement of the right second seat 17 to the left foot space 18.

The right seat back of the second seat 17 shown in FIG. 23 is tilted down onto the right seat cushion.

The second seat 17 with the right seat back lying on the seat cushion pivots (moves in tumbling fashion) on the inner and outer pivots 87, 88 (FIG. 20) into the stowed position (upright position) within the right foot space 19.

As shown in FIG. 34(*a*), the locking member 175 of the right locking mechanism 171 is pulled up by a user, as indicated by an arrow F, with the grip 185 (FIG. 11) held by his hand to bring the locking lugs 176 out of the first locking holes 181.

In this state, the second seat 17 in the stowed position (FIG. 6) moves toward the left foot space 18 (FIG. 23) along the fixed rail 35.

As shown in FIG. 34(*b*), the locking member 175 with lower ends 176*a* of the locking lugs 176 on the bottom section 35*a* of the fixed rail 35 move as indicated by an arrow H.

By moving as indicated by the arrow H, the locking lugs 176 arrive at the second locking holes 144, 144.

As shown in FIG. 34(*c*), the locking lugs 176 and the second locking holes 144, 144 are configured not to be in locking engagement with each other. It is therefore possible for the locking lugs 176 (right slider 86; see FIG. 35(*b*)) to smoothly move without stopping in locking engagement with the second locking holes 144, 144.

As shown in FIG. 35(*a*), the locking lugs 176 arrive at the second locking holes 182 after moving as indicated by an arrow H. As a result, the locking lugs 176 are fitted into the second locking holes 182 for locking engagement therewith.

The locking engagement of the locking lugs 176 with the second locking holes 182 locks the right slider 86 at location P6, as shown in FIG. 35(*b*).

With the right slider 86 locked at the location P6, the second seat 17 (FIG. 6) which has upward pivoted into the stowed position is held in the left foot space 18.

With the second seat 17 held in the left foot space 18, the left slider 48 and the right slider 86 are both disposed forward of the first seat 16 such that the left slider 48 and the right slider 86 do not interfere.

The right foot space 19 (FIG. 23) and the space sized to accommodate the second seat 17 in the seating position are made open by movement of the second seat 17 to the left foot space 18. The space sized to accommodate the second seat 17 in the seating position, the right foot space 19 and the luggage compartment 24 (FIG. 33) define a large luggage space, such that a bicycle 137 (FIG. 33) or other large luggage can be loaded into the large luggage space.

As explained in relation to FIG. 23 to FIG. 35, the luggage space 135 can be formed by the three spaces, i.e., the space 136, the left foot space 18 and the luggage compartment 24. Furthermore, the luggage space can be formed by the three spaces, i.e., the space sized to accommodate the second seat 17 in the seating position, the right foot space 19 and the luggage compartment 24.

Depending upon application of the vehicle, it is possible to determine whether to move the first seat 16 for creating the large luggage space 135 or to move the second seat 17 for creating the large luggage space. The degree of freedom of the layout for creating the luggage space is thereby increased, and the convenience of use can be improved.

A modification to the seat assembly 15 is described with reference to FIG. 36.

(Modification)

Figure 36:
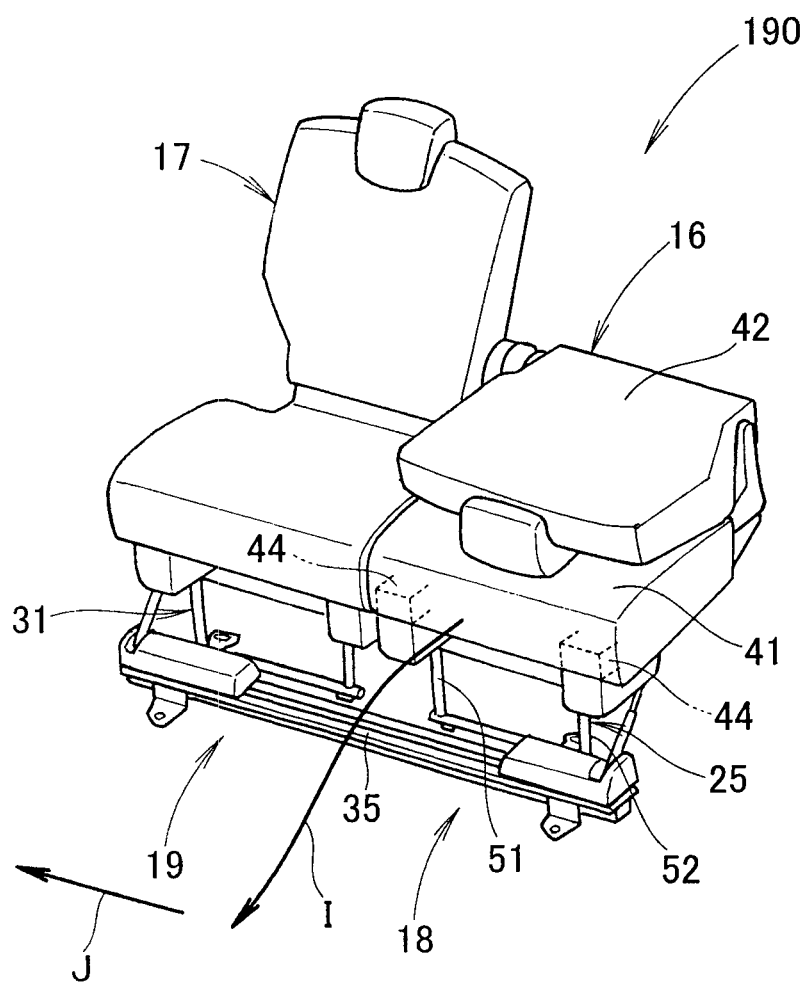
FIG. 36 is a perspective view of a modified seat assembly including the first seat arranged to move in a "dive down" manner.

As shown in FIG. 36, a modified seat assembly 190 includes the left leg mechanism 25 (having the inner and outer vertical leg sections 51, 52) pivotably provided to the first seat 16, and the right leg mechanism 31 pivotably provided to the second seat 17, such that the first and second seats 16, 17 are forward movable substantially in parallel to each other (movable in such a manner as to "dive downward"). Other elements of the seat assembly 190 are the same as those of the seat assembly 15.

Description is made as to movement of the first seat 16 of the modified seat assembly 190 into the stowed position in the right foot space 19.

First, the left seat back 42 of the first seat 16 is tilted down onto the left seat cushion 41.

The left leg mechanism 25 (inner and outer vertical leg sections 51, 52) with the seat back 42 lying on the seat cushion 41 pivots forward, after which the first seat 16 slides forward on the left inner and outer slide rails 44, as indicated by an arrow I.

The first seat 16 finishes "diving downward" to the left foot space 18 (i.e., the first seat 16 with the seat back 42 overlying the seat cushion 41 moves to the left foot space 18 substantially in parallel to the second seat 17).

Second, the first seat 16 moves out of the left foot space 18 along the fixed rail 35, in the lateral direction of the vehicle, as indicated by an arrow J, such that the first seat 16 can be stowed forward of the right second seat 17 (i.e., in the right foot space 19).

It is to be noted that the second seat 17 of the seat assembly 190 may be stowed in the left foot space 18, as in the first seat 16.

In the modified seat assembly 190 as well, the left prevention member 133 is located to bend the operation strap 161 into orientation substantially orthogonal to the locking member 141 (to the direction of the arrow, i.e., the upward direction in which the locking member 141 is movable) when viewed in side elevation, as shown in FIG. 17.

With the operation strap 161 bent in the orientation perpendicular to the locking member 141, a tensile force F1 acts on the locking member 141 in the direction orthogonal to the left lock member 141, as indicated by the arrow, when the user pulls the left operation strap 161, holding the grip 162.

The tensile force F1, which is applied to the locking member 141 in the direction perpendicular thereto, does not lift up the locking member 141.

It is thus possible to reliably prevent the first seat 16 in the seating position from moving in the lateral direction of the vehicle, and convenience of use can be improved.

In the illustrated embodiment, the horizontal leg section 53 has been described as extending between and interconnecting the lower ends 51*b*, 52*b* of the inner and outer vertical leg sections 51, 52, but the horizontal leg section 53 may be defined by the inner and outer vertical leg sections 51, 52 bent at right angles.

In the illustrated embodiment, the inner and outer horizontal sections 54, 55 have been described as extending substantially horizontally and forward from the horizontal leg section 53 connected to the lower ends 51b, 52b of the inner and outer vertical leg sections 51, 52, but the inner and outer horizontal sections 54, 55 may extend substantially horizontally and forward directly from the lower ends 51b, 52b of the left inner and outer vertical leg sections 51, 52.

In the illustrated embodiment, the left and right operation members 132, 172 are described as being pulled upward to thereby unlock the left and right locking mechanisms 131, 171, but the left and right operation members 132, 172 may be pulled in a predetermined direction other than the upward direction to unlock the mechanisms 131, 171.

Furthermore, in the illustrated embodiment, the left prevention member 133 has been described as being disposed on the portion 53a of the horizontal leg section 53 in the vicinity of the outer vertical leg section 52, but the left prevention member may be disposed on another member located at a side of the seat cushion.

INDUSTRIAL APPLICABILITY

The present invention is advantageously applied to an automobile including a seat assembly having a seat cushion supported in such a manner as to slide laterally as well as to move between a seating position and a stowed position.

REFERENCE SIGNS LIST

10: vehicle, 11: vehicle body floor (floor), 15: seat assembly, 16: first seat, 17: second seat, 25: left leg mechanism, 31: right leg mechanism, 35: fixed rail, 41: seat cushion (left seat cushion), 45: first front leg (left front leg), 47: left movement mechanism (first movement mechanism), 48: left slider (first slider), 51, 52: first and second vertical leg sections (inner and outer vertical leg sections), 53: a portion of the horizontal leg section in a vicinity of the outer vertical leg section (seat cushion-side member), 54, 55: first horizontal sections (inner and outer horizontal sections), 56, 57: inner and outer support members (first elastic member), 61,87: inner pivots, 62, 88: outer pivots, 76, 77: second horizontal section (inner and outer horizontal sections), 78, 79: second vertical leg section (inner and outer vertical leg sections), 85: second movement mechanism (right movement mechanism), 86: second slider (right slider), 89: second front leg (right front leg), 131: locking mechanism, 132: operation member, 133: prevention member, 161: operation strap, 171: locking mechanism, 172: operation member, 173: prevention member, P1: first position (retracted position), P2: second position (support position), P3: left predetermined location (predetermined location), P4: a predetermined location, P5: right predetermined location (predetermined location), P6: predetermined location.

The invention claimed is:

1. A seat assembly including first and second seats disposed laterally and a first movement mechanism for allowing a first seat cushion of the first seat to move between a seating position and a stowed position located forward of the seating position, the seat assembly comprising:
a fixed rail disposed forward of the first and second seats and extending in a direction along widths of the first and second seats, the fixed rail being supported on a floor supporting the first and second seats;
a first slider slidably connected to the fixed rail and supporting the first movement mechanism; and
a first front leg including a first vertical leg section extending substantially vertically and having an upper end connected to a front portion of the first seat, and a first horizontal section extending substantially horizontally and forward from a lower end of the first vertical leg section, the first horizontal section having a front portion pivotably connected to the first slider,
wherein the lower end of the first vertical leg section is supported by the floor when the first seat is in the seating position.

2. The seat assembly of claim 1, wherein the front portion of the first horizontal section is pivotably supported by the first slider via a pivot extending in the direction along the widths of the first and second seats.

3. The seat assembly of claim 1, wherein the first front leg further includes a first elastic member interposed between the lower end of the first vertical leg section and the floor when the first seat is in the seating position.

4. The seat assembly of claim 1, further comprising:
a locking mechanism for locking the first slider to the fixed rail;
an operation member for unlocking the locking mechanism; and
a prevention member for preventing the operation member from unlocking the locking mechanism when the first seat cushion is in the seating position.

5. The seat assembly of claim 4, wherein the operation member has an operation strap connected to the locking mechanism for unlocking the locking mechanism by pulling the locking mechanism in a predetermined direction, the prevention member is disposed on a member located on a side of the first seat cushion, and the operation strap is bent in a direction substantially orthogonal to the predetermined direction when the seat cushion is in the seating position.

6. The seat assembly of claim 1, further comprising a support member movable between a first position located below a bottom surface of the first seat cushion when the first seat cushion of the first seat is held in the seating position and a second position located below a lower end of the first seat cushion when the first seat cushion moves to the stowed position.

7. The seat assembly of claim 6, further comprising a link mechanism interconnecting the support member and a member on the floor side for moving the support member to the second position as the first seat cushion moves forward from the seating position into an upright position, and moving the support member to the first position as the first seat cushion moves from the upright position to the seating position.

8. The seat assembly of claim 7, wherein the support member comprises a caster capable of rolling along the floor in a lateral direction of a vehicle.

9. The seat assembly of claim 6, wherein the support member comprises a caster capable of rolling along the floor in a lateral direction of a vehicle.

10. The seat assembly of claim 1, further comprising:
a locking mechanism for locking the first slider at a predetermined location of the fixed rail in a lateral direction of a vehicle; and
a prevention member for preventing the first seat cushion from moving to the seating position when the locking mechanism is in an unlocked position.

11. The seat assembly of claim 10, wherein the prevention member interferes with the locking mechanism to prevent the first seat cushion from moving to the seating position when the lock mechanism is in the unlocked position.

12. The seat assembly of claim 1, further comprising:
- a second movement mechanism for allowing the second seat to move between a seating position and a stowed position located forward of the seating position; and
- a second slider slidably connected to the fixed rail and supporting the second movement mechanism.

13. The seat assembly of claim 12, further comprising a second front leg including a second vertical leg section extending substantially vertically and having an upper end connected to a front portion of the second seat, and a second horizontal section extending substantially horizontally and forward from a lower end of the second vertical leg section, the second horizontal section having a front portion pivotably connected to the second slider, wherein the lower end of the second vertical leg section is supported by the floor when the second seat is in the seating position.

* * * * *